(12) United States Patent
Kobayashi

(10) Patent No.: US 9,606,279 B2
(45) Date of Patent: Mar. 28, 2017

(54) PROCESS FOR PRODUCING OPTICALLY ANISOTROPIC FILM

(71) Applicant: Sumitomo Chemical Company, Limited, Tokyo (JP)

(72) Inventor: Tadahiro Kobayashi, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/560,040

(22) Filed: Dec. 4, 2014

(65) Prior Publication Data

US 2015/0160388 A1    Jun. 11, 2015

(30) Foreign Application Priority Data

Dec. 5, 2013 (JP) .................................. 2013-251757

(51) Int. Cl.
  *G02B 5/30* (2006.01)
  *G02F 1/13363* (2006.01)
  *G02F 1/1335* (2006.01)

(52) U.S. Cl.
  CPC ......... *G02B 5/3016* (2013.01); *G02B 5/3025* (2013.01); *G02B 5/3033* (2013.01); *G02B 5/3083* (2013.01); *G02F 1/13363* (2013.01); *G02F 1/133528* (2013.01)

(58) Field of Classification Search
  CPC .... G02B 5/3016; G02B 5/3025; G02B 5/305; G02B 5/3083; G02F 1/13363; G02F 1/13528
  See application file for complete search history.

(56) References Cited

U.S. PATENT DOCUMENTS

| 5,780,629 | A  | 7/1998 | Etzbach et al. |
| 6,217,792 | B1 | 4/2001 | Parri et al.   |
| 6,723,395 | B2 | 4/2004 | May et al.     |

(Continued)

FOREIGN PATENT DOCUMENTS

| JP | 06-034976 A | 2/1994 |
| JP | 09-506088 A | 6/1997 |

(Continued)

OTHER PUBLICATIONS

Liquid Crystal Handbook, Chapter 3, Section 4-3, "Chiral agent for TN and STN," ed: Japan Society for the Promotion of Science, 142 committee, pp. 199-202, 210, 213 (1989).

(Continued)

*Primary Examiner* — Shean C Wu
(74) *Attorney, Agent, or Firm* — Panitch Schwarze Belisario & Nadel LLP

(57) ABSTRACT

A process for producing an optically anisotropic film having high transparency is provided. A process for producing an optically anisotropic film is provided, wherein the following steps are carried out in order:
(1) a step of applying a composition for forming an optically anisotropic film to a substrate,
(2) a step of conveying the applied composition for forming an optically anisotropic film to a drying furnace under an environment with an air speed of 0.01 m/s to 0.2 m/s, and
(3) a step of removing the solvent by applying a 1 m/s or higher hot air to the applied composition for forming an optically anisotropic film in the drying furnace.

16 Claims, 2 Drawing Sheets

(56) References Cited

U.S. PATENT DOCUMENTS

| | | | |
|---|---|---|---|
| 7,136,225 | B2 | 11/2006 | Matsumoto et al. |
| 8,383,212 | B2 | 2/2013 | Obata et al. |
| 2005/0018116 | A1* | 1/2005 | Ishizuka ............... B05D 3/0413 349/117 |
| 2006/0177587 | A1* | 8/2006 | Ishizuka ............... B05D 3/0413 427/348 |
| 2011/0019131 | A1* | 1/2011 | Oki ....................... G02B 5/3033 349/75 |
| 2012/0008224 | A1 | 1/2012 | Uchida |

FOREIGN PATENT DOCUMENTS

| | | |
|---|---|---|
| JP | 2000-515496 A | 11/2000 |
| JP | 2003-137887 A | 5/2003 |
| JP | 3708062 B2 | 10/2005 |
| JP | 2007-148098 A | 6/2007 |
| JP | 2007-169178 A | 7/2007 |
| JP | 2007-176870 A | 7/2007 |
| JP | 2007-269639 A | 10/2007 |
| JP | 2007-269640 A | 10/2007 |
| JP | 2010-031223 A | 2/2010 |
| JP | 4432487 B2 | 3/2010 |
| JP | 2010-266883 A | 11/2010 |
| JP | 2010-270108 A | 12/2010 |
| JP | 2011-006360 A | 1/2011 |
| JP | 2011-207765 A | 10/2011 |
| JP | 2011-242743 A | 12/2011 |
| JP | 2012-033249 A | 2/2012 |

OTHER PUBLICATIONS

Liquid Crystal Handbook, Chapter 3, Section 8-6, "Network (Complete cross-linked type)" and Chapter 6, Section 5-1 "Liquid crystal material b. Polymerizable nematic liquid crystal material," ed: editorial committee of Liquid Crystal Handbook, Maruzen Co., Ltd. (Oct. 30, 2000).

* cited by examiner

PROCESS FOR PRODUCING OPTICALLY ANISOTROPIC FILM

FIELD OF THE INVENTION

The present application claims the Paris Convention priority based on Japanese Patent Application No. 2013-251757 filed on Dec. 5, 2013, the entire content of which is incorporated herein by reference.

The present invention relates to a process for producing an optically anisotropic film.

BACKGROUND OF THE INVENTION

A component comprising an optically anisotropic film, such as a polarization plate, a retardation film or the like, is used in a flat panel display device (FPD). As the optically anisotropic film, an optically anisotropic film is known which is produced by applying a composition comprising a liquid crystal compound to a substrate. For example, Patent Document 1 (JP 2007-148098 A) describes an optically anisotropic film produced by applying a composition comprising a liquid crystal compound to a substrate exposed to orientation treatment and polymerizing the composition.

Patent Document 1: JP 2007-148098 A

SUMMARY OF THE INVENTION

An optically anisotropic film produced by the conventional process for producing an optically anisotropic film does not have sufficient transparency.

The present invention includes the following embodiments.

[1] A process for producing an optically anisotropic film, wherein the following steps are carried out in order:

(1) a step of applying a composition for forming an optically anisotropic film, the composition comprising a liquid crystal compound and a solvent, to a substrate, (2) a step of conveying the applied composition for forming an optically anisotropic film to a drying furnace under an environment with an air speed of 0.01 m/s to 0.2 m/s, and (3) a step of removing the solvent by applying a 1 m/s or higher hot air to the applied composition for forming an optically anisotropic film in the drying furnace.

[2] The process for producing an optically anisotropic film according to [1], wherein a time required from the application of the composition for forming an optically anisotropic film in step (1) up to the application of the hot air in step (3) is from 2 seconds 5 minutes.

[3] The process for producing an optically anisotropic film according to [1] or [2], wherein an orientation film is formed on a surface of the substrate.

[4] The process for producing an optically anisotropic film according to [1], wherein the substrate has a protective film on a surface reverse to the surface on which the composition for forming an optically anisotropic film is applied.

[5] The process for producing an optically anisotropic film according to [1], wherein the substrate is an elongated film roll.

[6] An optically anisotropic film obtained by the process for producing an optically anisotropic film according to [1].

[7] The optically anisotropic film according to [6], wherein the liquid crystal compound is in vertical orientation.

[8] The optically anisotropic film according to [6] or [7] for use in an IPS (in-plane switching) liquid crystal display device.

[9] A retardation film comprising the optically anisotropic film according to [6] or [7].

[10] A polarization plate comprising the optically anisotropic film according to [6] or [7].

[11] A display device comprising the optically anisotropic film according to [6] or [7].

According to the present invention, it is possible to provide a process for producing an optically anisotropic film having high transparency.

DETAILED DESCRIPTION OF EMBODIMENTS

<Substrate>

Figure 1:
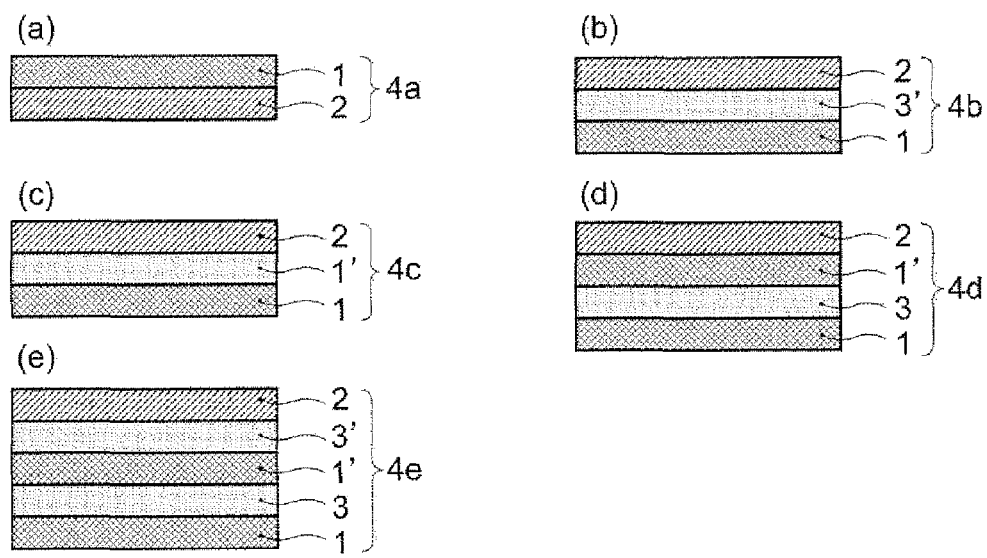
FIG. 1 is a diagram showing an example of a polarization plate according to the present invention.

The substrate is preferably a resin substrate.

The resin substrate is generally a transparent resin substrate. The transparent resin substrate refers to a substrate having translucency in which a light, in particular a visible light can be transmitted, and the translucency refers to a property in which a transmission of a light beam in a wavelength of 380 to 780 nm is 80% or higher. As the resin substrate, a film-shaped substrate is generally used, and an elongated film roll is preferably used. In the present specification, "long film roll" collectively refers to "roll-shaped long film" and "long film wound off from a roll-shaped long film".

Examples of a resin constituting the substrate include polyolefins such as polyethylene, polypropylene, norbornene-based polymers; polyvinyl alcohol; polyethylene terephthalate; polymethacrylic acid esters; polyacrylic acid esters; cellulosic esters; polyethylene naphthalate; polycarbonates; polysulfones; polyethersulfones; polyetherketones; polyphenylene sulfide; and polyphenylene oxide. Among them, a substrate comprising a polyolefin such as polyethylene, polypropylene or norbornene-based polymers is preferable.

A surface treatment may be performed on the substrate. Examples of a method of the surface treatment include a method of treating a substrate surface using corona or plasma under vacuum to atmosphere pressure; a laser treatment method of a substrate surface; an ozone treatment method of a substrate surface; a saponification treatment method of a substrate surface; a flame treatment method of a substrate surface; a method of applying a coupling agent to a substrate surface; a primer treatment method of a substrate surface; and a treatment method of carrying out a graft polymerization by exposure of radiation, corona or plasma after applying a reactive monomer or polymer to a substrate surface. Among them, the method of treating a substrate surface using corona or plasma under vacuum to atmosphere pressure is preferable.

Examples of the method of treating a substrate surface using corona or plasma under vacuum to atmosphere pressure include a method of treating a substrate surface by arranging the substrate between electrodes facing with each other and generating corona or plasma under a pressure close to atmosphere pressure; a method of flowing a gas between electrodes facing with each other, making the gas into plasma between the electrodes and applying the plasma-state gas to a substrate; and a method of treating a substrate surface by generating glow discharge plasma under a low pressure condition.

Among them, preferable is a method of treating a substrate surface by arranging the substrate between electrodes facing with each other and generating corona or plasma under a pressure close to atmosphere pressure, or a method of flowing a gas between electrodes facing with each other, making the gas into plasma between the electrodes and applying the plasma-state gas to a substrate. Such methods using corona or plasma are generally carried out by means of a commercially available surface treatment device.

The substrate may also have a protective film on a surface reverse to the surface on which the composition for forming an optically anisotropic film is applied. Examples of the protective film include a film such as polyethylene, polyethylene terephthalate, polycarbonate and polyolefins, and also a film additionally having an adhesion layer on the film. Among them, in view of a small thermal deformation in drying, polyethylene terephthalate is preferable. When the substrate has a protective film on a surface reverse to the surface on which the composition for forming an optically anisotropic film is applied, a shaking of the film and a slight vibration of the applied surface in conveying the substrate can be suppressed, and uniformity of a coating film can be improved.

The thickness of the substrate is generally from 5 μm to 300 μm, and preferably from 20 μm to 200 μm.

The length of the elongated film roll in the longitudinal direction is generally from 10 m to 3000 m, and preferably from 100 m to 2000 m. The length of the elongated film roll in the short direction is generally from 0.1 m to 5 m, and preferably from 0.2 m to 2 m.

<Orientation Film>

An orientation film is preferably formed on a surface on which the composition for forming an optically anisotropic film is applied.

The orientation film is a film having an orientation controlling force which orients a liquid crystal compound described below in a desired direction.

The orientation film preferably has high solvent resistance in which the film not dissolved by application of the composition for an optically anisotropic film or the like, and has heat resistance in a heat treatment for removing solvents or for orienting a liquid crystal compound. Examples of the orientation film include an orientation film comprising an anisotropic polymer, a photo-orientation film, a groove orientation film having an unevenness pattern or multiple grooves on its surface, and the like.

Such an orientation film makes an orientation of a liquid crystal compound easy. In addition, it is possible to control different orientations such as horizontal orientation, vertical orientation, hybrid orientation, inclined orientation and the like by selecting a type of an orientation film and a rubbing condition.

The thickness of the orientation film is generally in a range of 10 nm to 10000 nm, preferably in a range of 10 nm to 1000 nm, more preferably 500 nm or less, and further preferably in a range of 10 nm to 200 nm.

<Orientation Film Comprising Anisotropic Polymer>

Examples of the anisotropic polymer include polyamides and gelatins having amide bonds, polyimides having imide bonds and polyamic acids which are the hydrolysate thereof, polyvinyl alcohol, alkyl-modified polyvinyl alcohols, polyacrylamide, polyoxazoles, polyethylene imine, polystyrene, polyvinylpyrrolidone, polyacrylic acid, and polyacrylic acid esters. Among them, polyvinyl alcohol is preferable. It is also possible to combine two or more kinds of the anisotropic polymers.

The orientation film comprising an anisotropic polymer is generally obtained by applying an anisotropic polymer composition, in which an anisotropic polymer is dissolved in a solvent, to a substrate, and removing the solvent to form a coating film, or by applying the anisotropic polymer composition to a substrate, removing the solvent to form a coating film and rubbing the coating film.

Examples of the solvent include water; alcohol solvents such as methanol, ethanol, ethylene glycol, isopropyl alcohol, propylene glycol, methyl cellosolve, butyl cellosolve and propylene glycol monomethyl ether; ester solvents such as ethyl acetate, butyl acetate, ethylene glycol methyl ether acetate, γ-butyrolactone, propylene glycol methyl ether acetate and ethyl lactate; ketone solvents such as acetone, methyl ethyl ketone, cyclopentanone, cyclohexanone, methyl amyl ketone and methyl isobutyl ketone; aliphatic hydrocarbon solvents such as pentane, hexane and heptane; aromatic hydrocarbon solvents such as toluene and xylene; nitrile solvents such as acetonitrile; ether solvents such as tetrahydrofuran and dimethoxyethane; and chlorinated hydrocarbon solvents such as chloroform and chlorobenzene. It is also possible to combine two or more kinds of the solvents.

The concentration of the anisotropic polymer in the anisotropic polymer composition should be in such a range that the anisotropic polymer completely dissolves in a solvent. The content of the anisotropic polymer is preferably from 0.1 to 20% by mass and more preferably from 0.1 to 10% by mass, relative to the anisotropic polymer composition.

The anisotropic polymer composition is available in the market. Examples of a commercially available product of the anisotropic polymer composition include SUNEVER® (manufactured by NISSAN CHEMICAL INDUSTRIES, LTD.) and OPTMER® (manufactured by JSR Corporation).

Examples of a method for applying the anisotropic polymer composition to a substrate include known methods such as application methods including spin coating method, extrusion method, gravure coating method, die coating method, slit coating method, bar coating method and applicator method, and also printing methods including flexo printing method. When the optically anisotropic film is produced by a Roll-to-Roll type continuous production method, gravure coating method, die coating method or a printing method such as flexo printing method is generally employed as the application method.

Examples of a method for removing the solvent contained in the anisotropic polymer composition include air drying, draught drying, heat drying, vacuum drying and the combination method thereof. The drying temperature is preferably from 10 to 250° C., and more preferably from 25 to 200° C. The drying time is, depending on a solvent type, preferably from 5 seconds to 60 minutes, and more preferably from 10 seconds to 30 minutes.

The coating film formed of the anisotropic polymer composition may be exposed to a rubbing treatment. By the rubbing treatment, an orientation controlling force can be provided to the coating film.

Examples of a rubbing treatment method include a method in which the coating film is brought into contact with a rolling rubbing roll wrapped with a rubbing cloth.

In the rubbing treatment, it is also possible to form an orientation film having multiple areas (patterns) with different orientation directions by a masking treatment.

<Photo-Orientation Film>

The photo-orientation film can be generally obtained by applying the composition for forming a photo-orientation film to a substrate, and radiating a polarization light, preferably polarized UV, where the composition comprises a polymer or a monomer having a photoreactive group and a solvent. It is possible to arbitrarily control the direction of the orientation controlling force of the photo-orientation film by selecting a polarization direction of the radiated polarization light.

The photoreactive group refers to a group which generates an orientating force by light irradiation. Specific examples thereof include a group involved in a photoreaction as a source of the orientating force such as orientation-induced reaction, isomerization reaction, photodimerization reaction, photocrosslinking reaction or photodegradation reaction. The photoreactive group is preferably a group having a saturated group, in particular a double bond, and particularly preferably a group having at least one selected from the group consisting of a carbon-carbon double bond (C=C bond), a carbon-nitrogen double bond (C=N bond), a nitrogen-nitrogen double bond (N=N bond) and a carbon-oxygen double bond (C=O bond).

Examples of the photoreactive group having a CC bond include a vinyl group, a polyene group, a stilbene group, a stilbazole group, a stilbazolium group, a chalcone group and a cinnamoyl group. Examples of the photoreactive group having a C=N group include a group having a structure of a Schiff base, an aromatic hydrazone or the like. Examples of the photoreactive group having a N=N bond include an azobenzene group, an azonaphthalene group, an aromatic heterocyclic azo group, an azobis group, formazan group and a group having an azoxybenzene structure. Examples of the photoreactive group having a C=O bond include a benzophenone group, a coumalin group, an anthraquinone group and a maleimide group. These groups may also have a substituent group such as an alkyl group, an alkoxy group, an aryl group, an allyloxy group, a cyano group, an alkoxycarbonyl group, a hydroxyl group, a sulfonate group or a halogenated alkyl group.

As the photoreactive group, a group involved in photodimerization reaction or photocrosslinking reaction is preferable in view of its superior orientation. Among them, a group involved in photodimerization reaction is preferable, and in view that a radiating amount of a polarization light required for orientation is relatively low and that a photo-orientation film having thermal and temporal stabilities is easily obtained, a cinnamoyl group and a chalcone group are preferable. The polymer having a photoreactive group particularly preferably has a cinnamoyl group such that a terminal part of a side chain of the polymer has a cinnamic acid structure.

By applying the composition for forming a photo-orientation film on a substrate, it is possible to form an optical orientation-induced layer on the substrate. Examples of a solvent contained in the composition include the same solvents as those contained in the above anisotropic polymer composition, and the solvent can be selected depending on a solubility of the polymer or monomer having a photoreactive group.

The amount of the polymer or monomer having a photoreactive group in the composition for forming a photo-orientation film can be adjusted depending on the type of the polymer or monomer and the targeted thickness of the photo-orientation film. The amount is preferably at least 0.2% by mass, and more preferably in a range of 0.3 to 10% by mass. Unless the properties of the photo-orientation film are remarkably impaired, the composition for forming a photo-orientation film may also comprise a polymer material such as polyvinyl alcohol or a polyimide and a photosensitizer.

Examples of a method for applying the composition for forming a photo-orientation film to a substrate include the same methods as the methods for applying the anisotropic polymer composition to a substrate. Examples of a method for removing a solvent from the applied composition for forming a photo-orientation film include the same methods as the methods for removing a solvent from the anisotropic polymer composition.

In radiating a polarization light, it is possible either to radiate the polarization light directly to the composition for forming a photo-orientation film, which is applied on a substrate, after a solvent is removed, or to radiate a polarization light through a substrate by radiating the polarization light from a side of the substrate. The polarization light is preferably a substantially parallel light. The wavelength of the radiated light is preferably in such a wavelength range that the polymer or monomer having a photoreactive group may incorporate optical energy. Specially, UV (ultraviolet light) in a wavelength range of 250 to 400 nm is particularly preferable. Examples of a light source for radiating the polarization light include a xenon lamp, a high-pressure mercury lamp, an extra high-pressure mercury lamp, a metal halide lamp, ultraviolet laser such as KrF and ArF, and the like. Among them, a high-pressure mercury lamp, an extra high-pressure mercury lamp and a metal halide lamp are preferable, since an emission intensity of an ultraviolet light at a wavelength of 313 nm is high. A polarized UV can be radiated by radiating a light from the light source through a suitable polarization layer. Examples of the polarization layer include a polarization prism such as a polarized filter, a Glan-Thomson and a Glan-Taylor, and also a wire grid-type polarizer.

In radiating the polarization light, it is also possible to form an orientation film having multiple areas (patterns) with different orientation directions by a masking treatment.

<Groove Orientation Film>

A groove orientation film is a film having an unevenness pattern or multiple grooves on its surface. When a liquid crystal compound is arranged on a film having multiple liner grooves at equal intervals, the liquid crystal compound is oriented in the direction along the grooves.

Examples of a method for obtaining the groove orientation film include a method in which after exposure on a surface of a photoreactive polyimide film through an exposure mask having a slit in a pattern form, development and rinsing treatments are carried out to form an evenness pattern; a method in which a UV-curable resin layer before cured is formed on a plate-shaped base board having grooves on its surface, and the resin layer is transmitted onto a substrate and then cured; a method in which a film of a UV-curable resin before cured, which is formed on a substrate, is pressed onto a roll-shaped base board having multiple grooves to form unevenness and then cured; and the like. Specific examples of the methods include the methods described in JP 06-34976 A, JP 2011-242743 A and the like.

Among the above-mentioned methods, preferable is a method in which a film of a UV-curable resin before cured, which is formed on a substrate, is pressed onto a roll-shaped base board having multiple grooves to form unevenness and then cured. The roll-shaped base board preferably a stainless (SUS) steel, in view of durability.

Examples of the UV-curable resin include a monofunctional acrylate, a polyfunctional acrylate and the mixture thereof.

The monofunctional acrylate is a compound having one group selected from the group consisting of an acryloyloxy group ($CH_2$=CH—COO—) and a methacryloyloxy group ($CH_2$=C($CH_3$)—COO—) (hereinafter, also referred to as a (meth)acryloyloxy group). "(Meth)acrylate" means acrylate or methacrylate.

Examples of the monofunctional acrylate having one (meth)acryloyloxy group include an alkyl(meth)acrylate having 4 to 16 carbon atoms, a β-carboxyalkyl(meth)acrylate having 2 to 14 carbon atoms, an alkylated phenyl(meth)acrylate having 2 to 14 carbon atoms, methoxypolyethylene glycol(meth)acrylate, phenoxypolyethylene glycol(meth)acrylate and isobonyl(meth)acrylate.

The polyfunctional acrylate is a compound having two or more of (meth)acryloyloxy groups, and preferably a compound having 2 to 6 of (meth)acryloyloxy groups. Examples of the polyfunctional acrylate having two(meth)acryloyloxy groups include 1,3-butanediol di(meth)acrylate; 1,6-hexanediol di(meth)acrylate; ethylene glycol di(meth)acrylate; diethylene glycol di(meth)acrylate; neopentyl glycol di(meth)acrylate; triethylene glycol di(meth)acrylate; tetraethylene glycol di(meth)acrylate; polyethylene glycol diacrylate; bis(acryloyloxyethyl)ether of bisphenol A; ethoxylated bisphenol A di(meth)acrylate; propoxylated neopentyl glycol di(meth)acrylate; ethoxylated neopentyl glycol di(meth)acrylate, 3-methylpentanediol di(meth)acrylate.

Examples of the polyfunctional acrylate having 3 to 6 of (meth)acryloyloxy groups include trimethylolpropane tri(meth)acrylate; pentaerythritol tri(meth)acrylate; tris(2-hydroxyethyl)isocyanurate tri(meth)acrylate; ethoxylated trimethylolpropane tri(meth)acrylate; propoxylated trimethylolpropane tri(meth)acrylate; pentaerythritol tetra(meth)acrylate; dipentaerythritol penta(meth)acrylate; dipentaerythritol hexa(meth)acrylate; tripentaerythritol tetra(meth)acrylate; tripentaerythritol penta(meth)acrylate; tripentaerythritol hexa(meth)acrylate; tripentaerythritol hepta(meth)acrylate; tripentaerythritol octa(meth)acrylate; a reaction product of pentaerythritol tri(meth)acrylate with an acid anhydride; a reaction product of dipentaerythritol penta(meth)acrylate with an acid anhydride; a reaction product of tripentaerythritol hepta(meth)acrylate with an acid anhydride; caprolactone-modified trimethylolpropane tri(meth)acrylate; caprolactone-modified pentaerythritol tri(meth)acrylate; caprolactone-modified tris(2-hydroxyethyl) isocyanurate tri(meth)acrylate; caprolactone-modified pentaerythritol tetra(meth)acrylate; caprolactone-modified dipentaerythritol penta(meth)acrylate; caprolactone-modified dipentaerythritol hexa(meth)acrylate; caprolactone-modified tripentaerythritol tetra(meth)acrylate; caprolactone-modified tripentaerythritol penta(meth)acrylate; caprolactone-modified tripentaerythritol hexa(meth)acrylate; caprolactone-modified tripentaerythritol hepta(meth)acrylate; caprolactone-modified tripentaerythritol octa(meth)acrylate; a reaction product of caprolactone-modified pentaerythritol tri(meth)acrylate with an acid anhydride; a reaction product of caprolactone-modified dipentaerythritol penta(meth)acrylate with an acid anhydride; and a reaction product of caprolactone-modified tripentaerythritol hepta(meth)acrylate with an acid anhydride.

The "caprolactone-modified" refers to that a ring-opened body or a ring-opened polymer of caprolactone is introduced between an alcohol-derived moiety and a (meth)acryloyloxy group of a (meth)acrylate compound.

The polyfunctional acrylate is available in the market. Examples of the commercially available thereof include A-DOD-N, A-HD-N, A-NOD-N, APG-100, APG-200, APG-400, A-GLY-9E, A-GLY-20E, A-TMN-3, A-TMPT, AD-TMP, ATM-35E, A-TMMT, A-9550, A-DPH, HD-N, NOD-N, NPG and TMPT (manufactured by Shin-Nakamura Chemical Co., Ltd.); ARONIX M-220, M-325, M-240, M-270, M-309, M-310, M-321, M-350, M-360, M-305, M-306, M-450, M-451, M-408, M-400, M-402, M-403, M-404, M-405 and M-406 (manufactured by Toagosei Co., Ltd.); EBECRYL 11, 145, 150, 40, 140 and 180, DPGDA, HDDA, TPGDA, HPNDA, PETIA, PETRA, TMPTA, TMPEOTA, DPHA and EBECRYL series (manufactured by Daicel-cytec).

In order to obtain an orientation with little orientation disturbance, the width of the protrusion of the groove orientation film is preferably from 0.05 μm to 5 μm, the width of the recess is preferably from 0.1 μm to 5 μm, and the gap depth of the evenness is preferably 2 μm or less and more preferably from 0.01 μm to 1 μm.

<Composition for Forming Optically Anisotropic Film>

The composition for forming an optically anisotropic film comprises a liquid crystal compound and a solvent.

<Liquid Crystal Compound>

Examples of the liquid crystal compound include a compound having a group represented by formula (X) (hereinafter, also referred to as "compound (X)"):

$$P^{11}\text{—}B^{11}\text{-}E^{11}\text{-}B^{12}\text{-}A^{11}\text{-}B^{13}\text{—} \quad (X)$$

wherein $P^{11}$ represents a hydrogen atom or a polymerizable group, $A^{11}$ represents a divalent alicyclic hydrocarbon group or a divalent aromatic hydrocarbon group, where a hydrogen atom of the divalent alicyclic hydrocarbon group and of the divalent aromatic hydrocarbon group may be substituted with a halogen atom, an alkyl group having 1 to 6 carbon atoms, an alkoxy group having 1 to 6 carbon atoms, a cyano group or a nitro group, and where a hydrogen atom of the alkyl group having 1 to 6 carbon atoms and of the alkoxy group having 1 to 6 carbon atoms may be substituted with a fluorine atom, $B^{11}$ represents —O—, —S—, —CO—O—, —O—CO—, —O—CO—O—, —CO—$NR^{16}$—, —$NR^{16}$—CO—, —CO—, —CO—, —CS— or a single bond, where $R^{16}$ represents a hydrogen atom or an alkyl group having 1 to 6 carbon atoms, $B^{12}$ and $B^{13}$ each independently represent —C≡C—, —CH=CH—, —$CH_2CH_2$—, —O—, —S—, —C(=O)—, —C(=O)—O—, —O—C(=O)—, —O—C(=)—O—, —CH=N—, —N=CH—, —N=N—, —C(=O)—$NR^{16}$, —$NR^{16}$—C(=O)—, —$OCH_2$—, —$OCF_2$—, —$CH_2O$—, —$CF_2O$—, —CH=CH—C(=O)—O—, —O—C(=O)—CH=CH— or a single bond, and $E^{11}$ represents an alkanediyl group having 1 to 12 carbon atoms, where a hydrogen atom contained in the alkanediyl group may be also substituted with an alkoxy group having 1 to 5 carbon atoms, a hydrogen atom of the alkoxy group may be also substituted with a halogen atom, and —$CH_2$— constituting the alkanediyl group may be also substituted with —O— or —CO—. It is also possible to use the liquid crystal compound alone, or to combine multiple compounds having different structures.

The carbon number of the divalent alicyclic hydrocarbon group and divalent aromatic hydrocarbon group represented by $A^{11}$ is preferably in a range of 3 to 18, more preferably in a range of 5 to 12, and particularly preferably 5 or 6. $A^{11}$ is preferably cyclohexane-1,4-diyl group or 1,4-phenylene group.

The alkanediyl group having 1 to 12 carbon atoms represented by $E^{11}$ is preferably a liner alkanediyl group having 1 to 12 carbon atoms, where —$CH_2$— constituting the alkanediyl group having 1 to 12 carbon atoms may be also substituted with —O—.

Specific examples thereof include liner alkanediyl groups having 1 to 12 carbon atoms such as methylene group, ethylene group, propane-1,3-diyl group, butane-1,4-diyl group, pentane-1,5-diyl group, hexane-1,6-diyl group, heptane-1,7-diyl group, octane-1,8-diyl group, nonane-1,9-diyl group, decane-1,10-diyl group, undecane-1,11-diyl group and dodecane-1,12-diyl group —$CH_2$—$CH_2$—O—$CH_2$—$CH_2$—, —$CH_2$—$CH_2$—O—$CH_2$—$CH_2$—O—$CH_2$—$CH_2$—, and —$CH_2$—$CH_2$—O—$CH_2$—$CH_2$—O—$CH_2$—$CH_2$—O—$CH_2$—$CH_2$—.

$B^{11}$ is preferably —O—, —S—, —CO—O— or —O—CO—, and among them, —CO—O— is more preferable.

$B^{12}$ and $B^{13}$ are preferably, each independently, —O—, —S—, —C(=O)—, —C(=O)—O—, —O—C(=O)— or —O—C(=O)—O—, and among them, —O— or —O—C(=O)—O— is more preferable.

$P^{11}$ is preferably a polymerizable group. In view that a photopolymerization reaction tends to take place, a radically polymerizable group or a cationically polymerizable group is preferable, and in view of an easy handling and an easiness to produce a liquid crystal compound, the polymerizable group is preferably a stilbene group or a group represented by the following formulae (P-11) to (P-15):

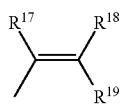
(P-11)

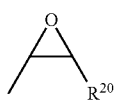
(P-12)

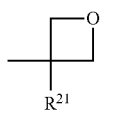
(P-13)

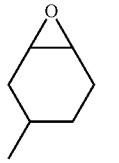
(P-14)

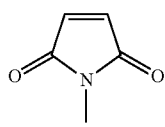
(P-15)

wherein $R^{17}$ to $R^{21}$ each independently represent an alkyl group having 1 to 6 carbon atoms or a hydrogen atom.

Specific examples of the group represented by formulae (P-11) to (P-13) include a p-stilbene group and groups represented by the following formulae (P-16) to (P-20).

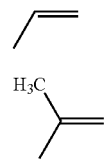
(P-16)

(P-17)

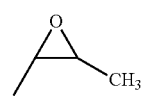
(P-18)

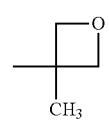
(P-19)

(P-20)

$P^{11}$ is preferably a group represented by formulae (P-14) to (P-20), and more preferably a vinyl group, an epoxy group or an oxetanyl group.

The group represented by $P^{11}$—$B^{11}$— is further preferably an acryloyloxy group or a methacryloyloxy group.

Examples of compound (X) include a compound represented by formulae (I), (II), (III), (IV), (V) and (VI):

$P^{11}$—$B^{11}$—$E^{11}$—$B^{12}$—$A^{11}$—$B^{13}$—$A^{12}$—$B^{14}$—$A^{13}$—$B^{15}$—$A^{14}$—$B^{16}$—$E^{12}$—$B^{17}$—$P^{12}$ (I)

$P^{11}$—$B^{11}$—$E^{11}$—$B^{12}$—$A^{11}$—$B^{13}$—$A^{12}$—$B^{14}$—$A^{13}$—$B^{15}$—$A^{14}$—$F^{11}$ (II)

$P^{11}$—$B^{11}$—$E^{11}$—$B^{12}$—$A^{11}$—$B^{13}$—$A^{12}$—$B^{14}$—$A^{13}$—$B^{15}$—$E^{12}$—$B^{17}$—$P^{12}$ (III)

$P^{11}$—$B^{11}$—$E^{11}$—$B^{12}$—$A^{11}$—$B^{13}$—$A^{12}$—$B^{14}$—$E^{12}$—$A^{13}$—$F^{11}$ (IV)

$P^{11}$—$B^{11}$—$E^{11}$—$B^{12}$—$A^{11}$—$B^{13}$—$A^{12}$—$B^{14}$—$E^{12}$—$B^{17}$—$P^{12}$ (V)

$P^{11}$—$B^{11}$—$E^{11}$—$B^{12}$—$A^{11}$—$B^{13}$—$A^{12}$—$F^{11}$ (VI)

wherein $A^{12}$ to $A^{14}$ each independently are defined in the same manner as $A^{11}$, $B^{14}$ to $B^{16}$ each independently are defined in the same manner as $B^{12}$, $B^{17}$ is defined in the same manner as $B^{11}$, and $E^{11}$ is defined in the same manner as $E^{11}$, $F^{11}$ represents a hydrogen atom, an alkyl group having 1 to 13 carbon atoms, an alkoxy group having 1 to 13 carbon atoms, a cyano group, a nitro group, a trifluoromethyl group, a dimethylamino group, a hydroxy group, a methylol group, a formyl group, a sulfo group (—$SO_2H$), a carboxy group, an alkoxycarbonyl group having 1 to 10 carbon atoms or a halogen atom, where —$CH_2$— constituting the alkyl group and alkoxy group may be also substituted with —O—, and $P^{12}$ represents a hydrogen atom or a polymerizable group, and preferably a polymerizable group, and examples thereof include the polymerizable groups described above $P^{11}$, and at least one of $P^{11}$ and $P^{12}$ is a polymerizable group.

Specific examples of the liquid crystal compound include liquid compounds described in "3.8.6 Network (Complete crosslink type)" and "6.5.1 Liquid crystal material b. Polymerizable nematic liquid crystal material" in "Liquid crystal handbook" (edited by editorial committee of Liquid crystal handbook, Maruzen Co., Ltd., Oct. 30, 2000), JP 2010-31223 A, JP 2010-270108 A, JP 2011-6360 A and JP 2011-207765 A.

The liquid crystal compound preferably has a polymerizable group. Examples of the polymerizable group include the above-mentioned polymerizable group represented by $P^{11}$.

Specific examples of compound (X) include compounds represented by the following formulae (I-1) to (I-4), formulae (II-1) to (II-4), formulae (III-1) to (III-26), formulae (IV-1) to (IV-26), formulae (V-1) to (V-2) and formulae (VI-1) to (VI-6). In the following formulae, k1 and k2 each independently represent an integer from 2 to 12. In view of easy synthesis and availability, preferable are compounds (X) represented by formulae (I-1) to (I-4), formulae (II-1) to (II-4), formulae (III-1) to (III-26), formulae (IV-1) to (IV-26), formulae (V-1) to (V-2) and formulae (VI-1) to (VI-6).

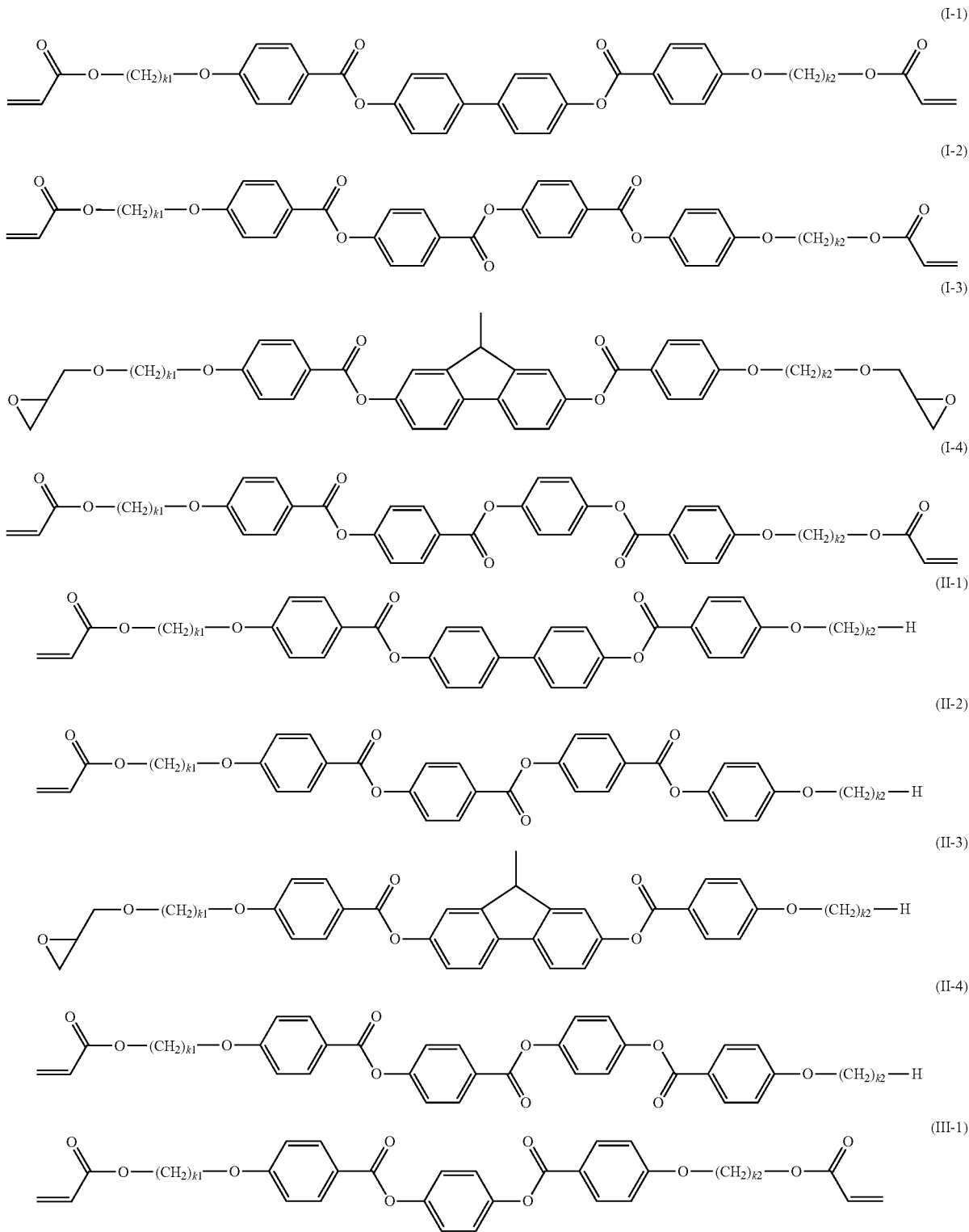

(III-2)
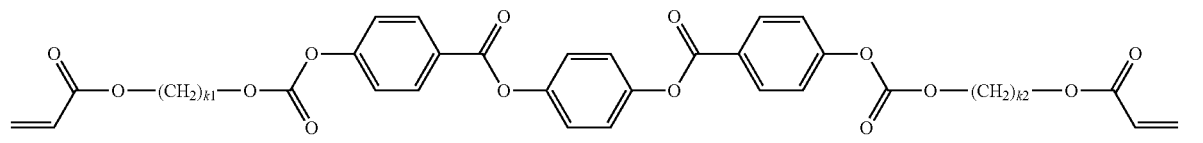
(III-3)
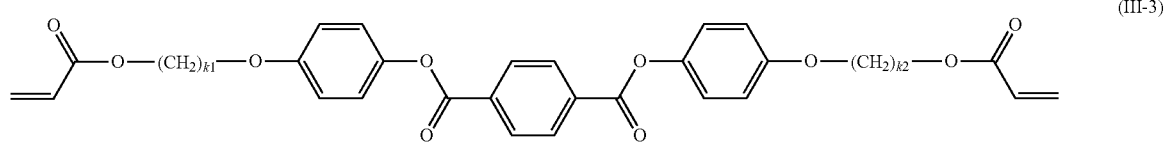
(III-4)
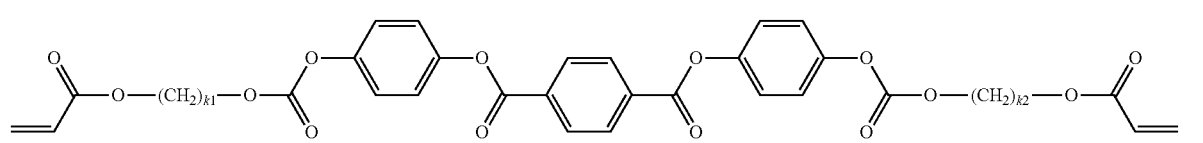
(III-5)
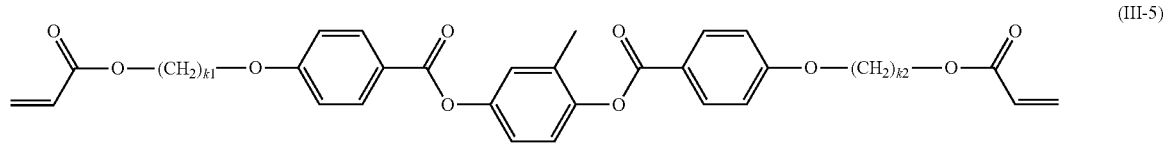
(III-6)
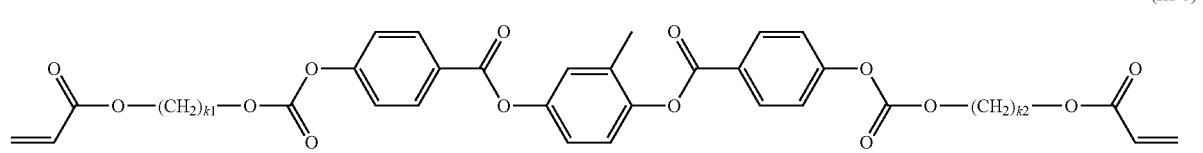
(III-7)
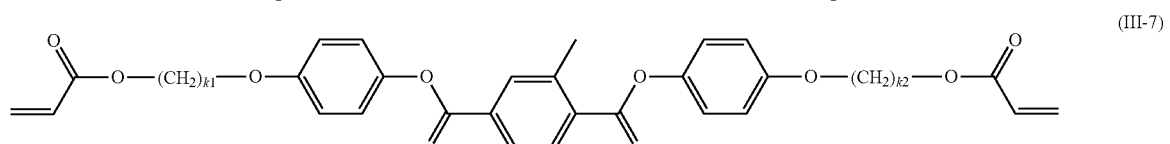
(III-8)
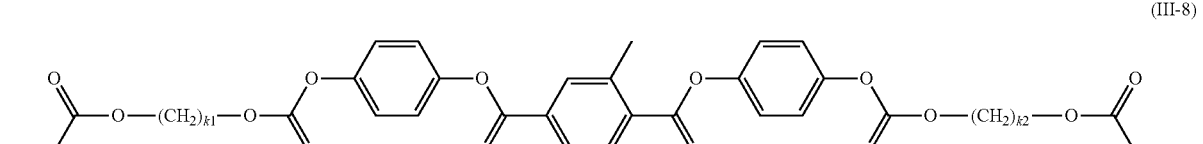
(III-9)
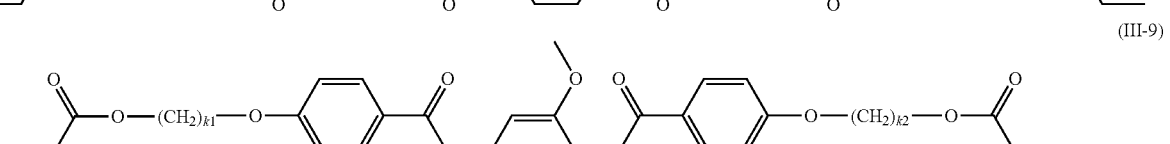
(III-10)
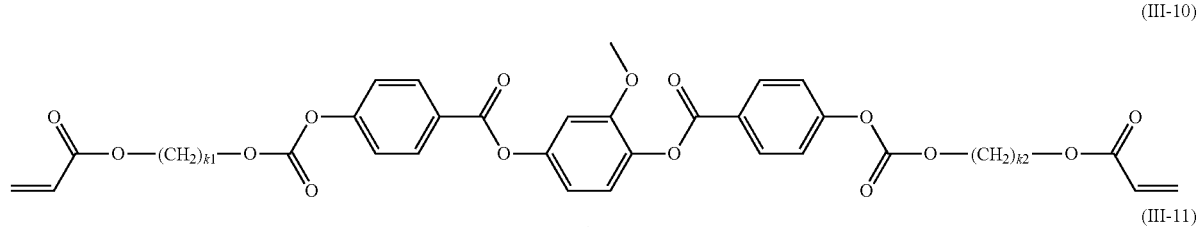
(III-11)
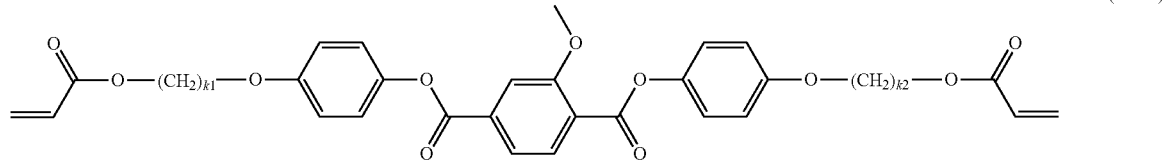

-continued
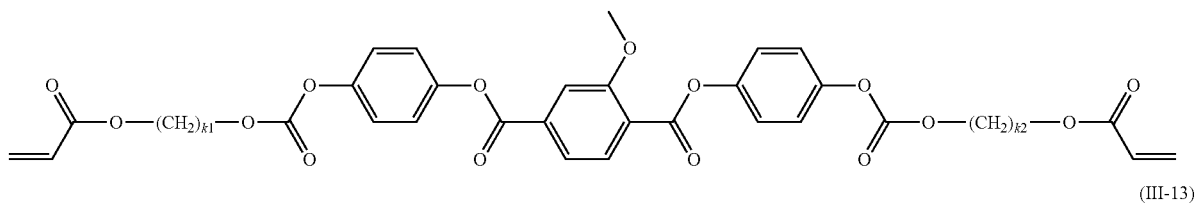
(III-12)
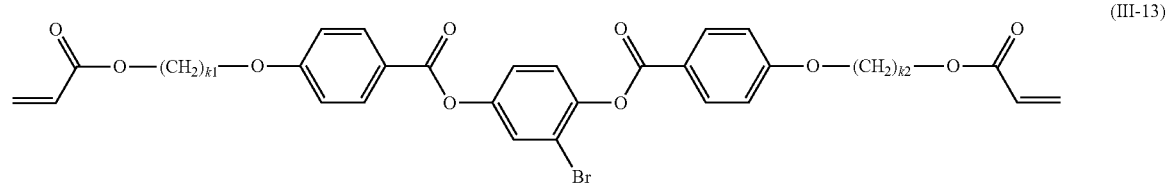
(III-13)
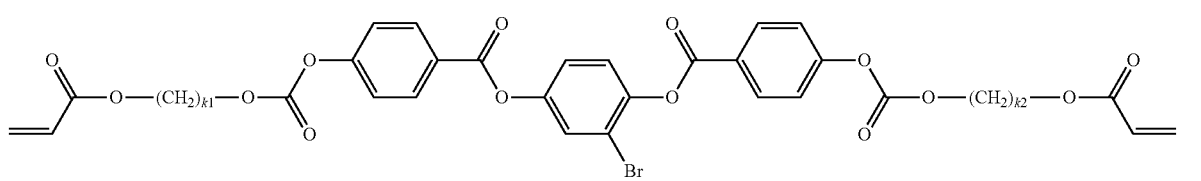
(III-14)
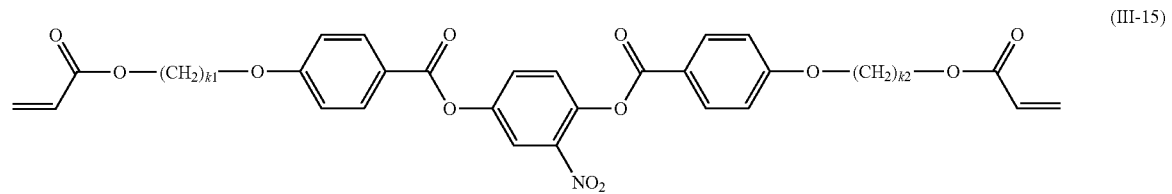
(III-15)
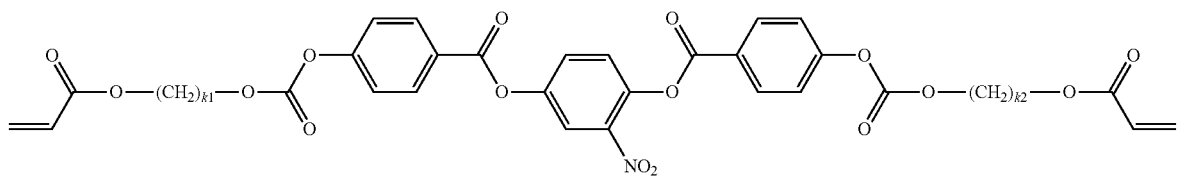
(III-16)
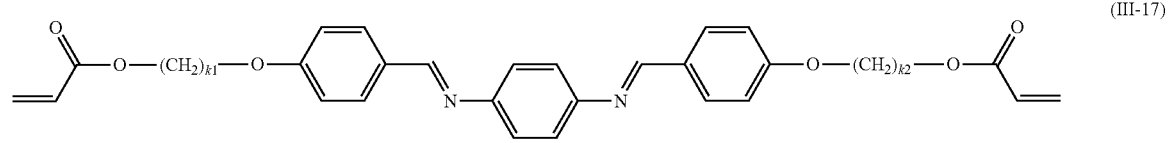
(III-17)
(III-18)
(III-19)
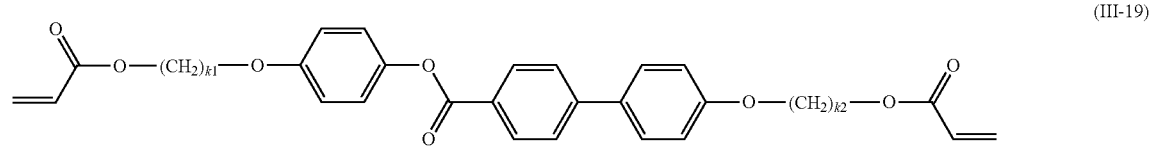
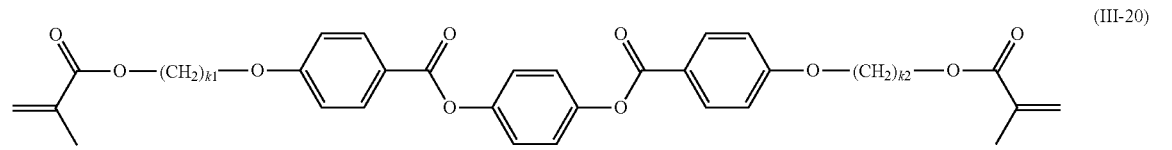
(III-20)

-continued
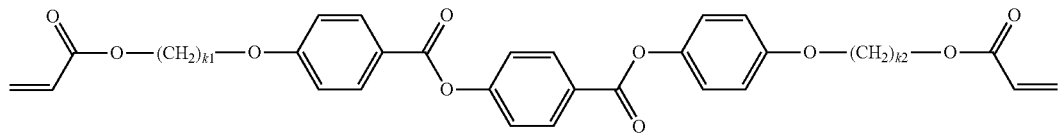 (III-21)
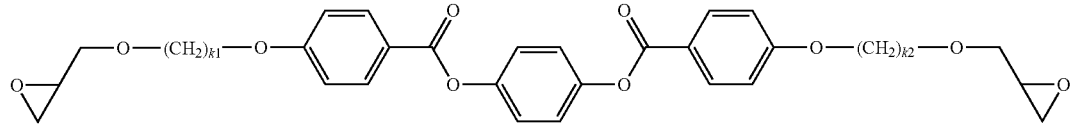 (III-22)
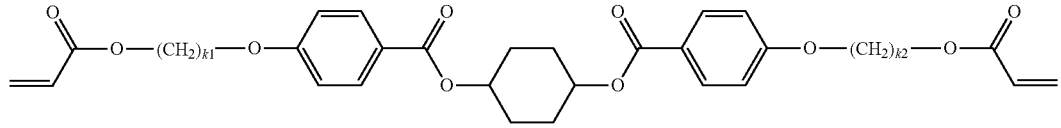 (III-23)
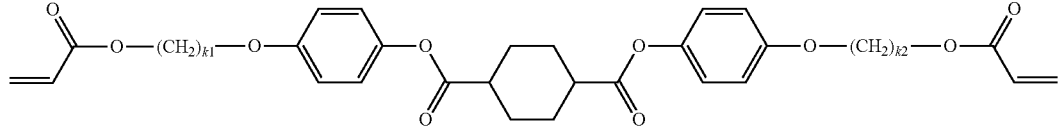 (III-24)
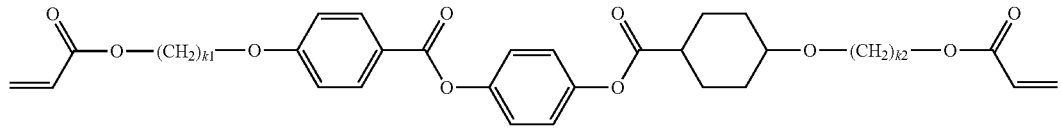 (III-25)
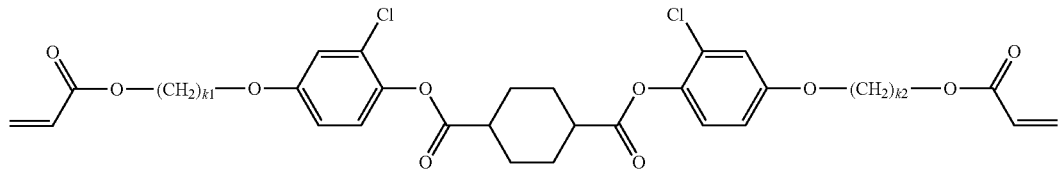 (III-26)
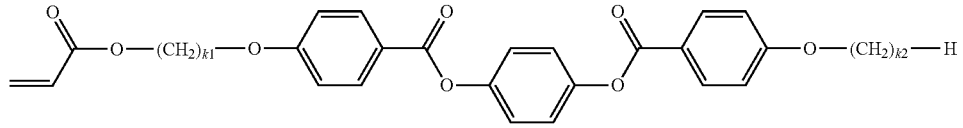 (IV-1)
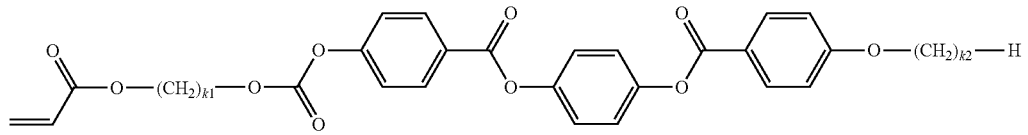 (IV-2)
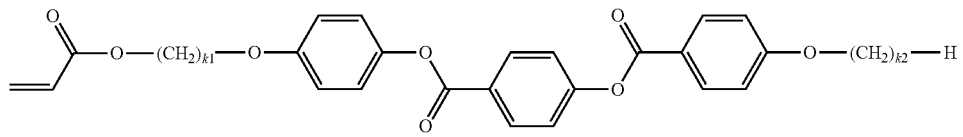 (IV-3)
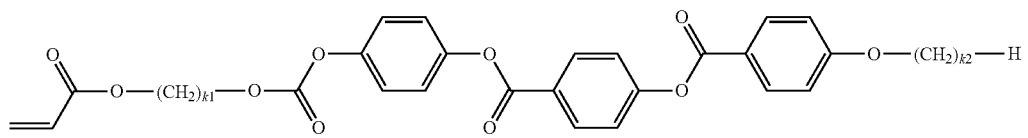 (IV-4)
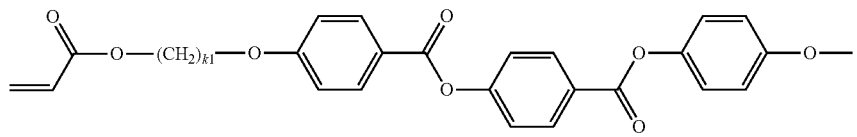 (IV-5)

-continued
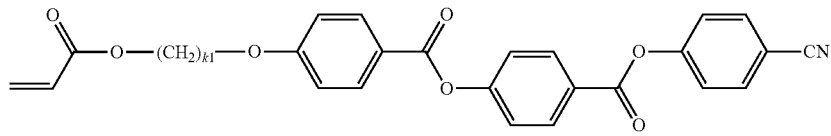
(IV-6)
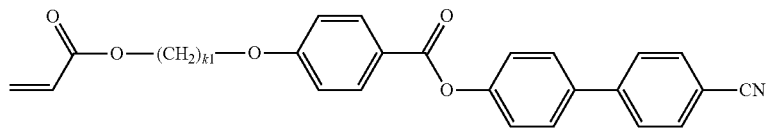
(IV-7)
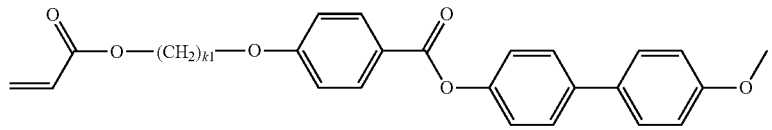
(IV-8)
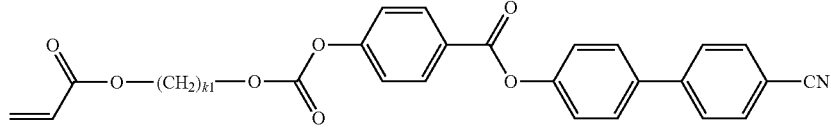
(IV-9)
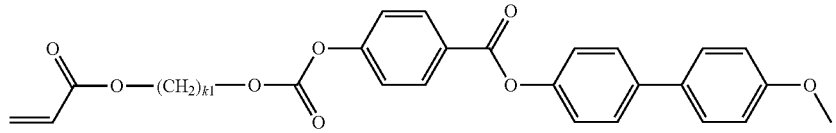
(IV-10)
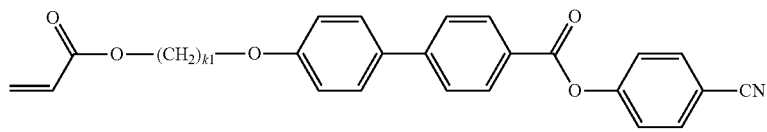
(IV-11)
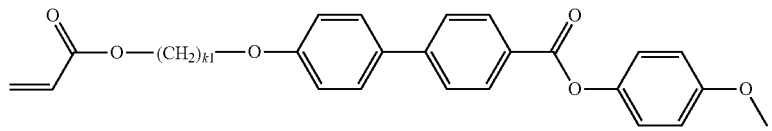
(IV-12)
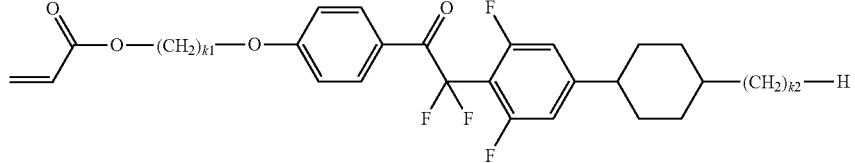
(IV-13)
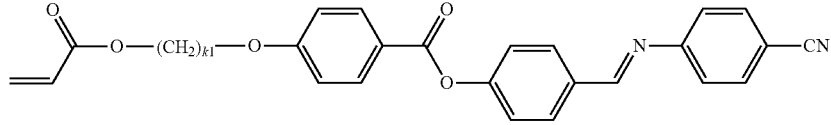
(IV-14)
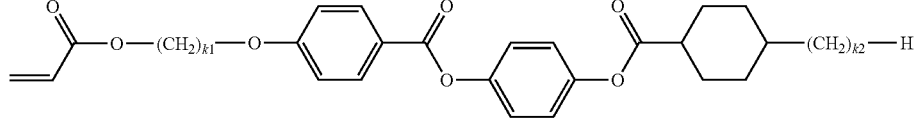
(IV-15)
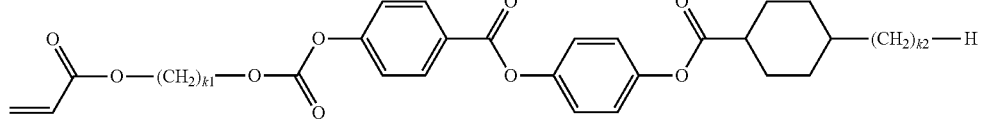
(IV-16)

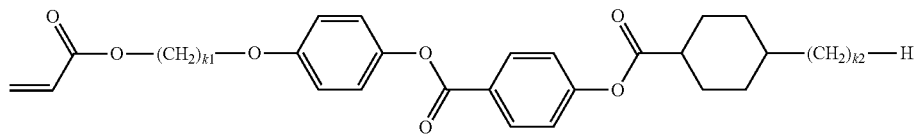
(IV-17)
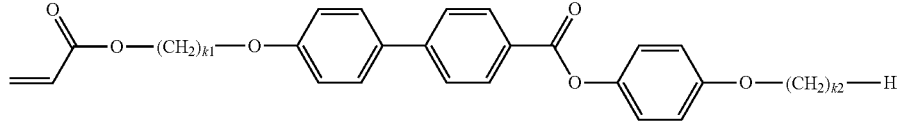
(IV-18)
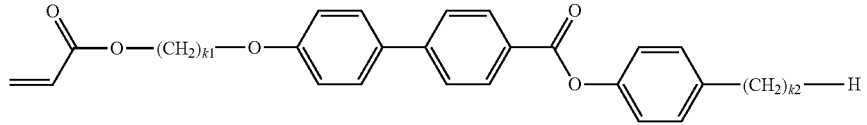
(IV-19)
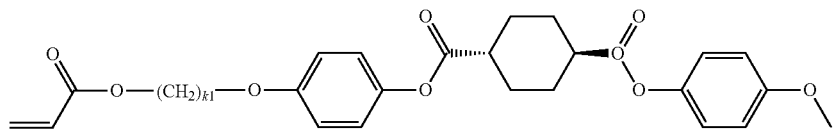
(IV-20)
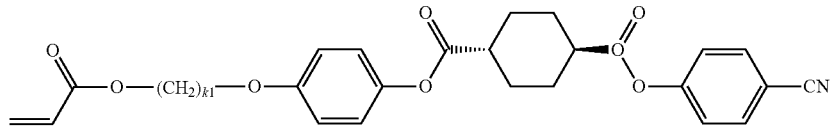
(IV-21)
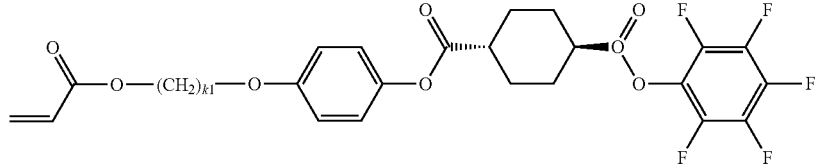
(IV-22)
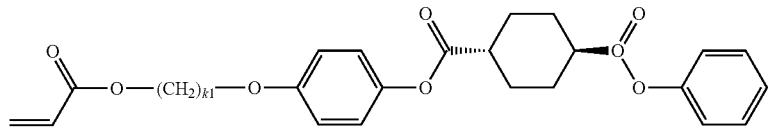
(IV-23)
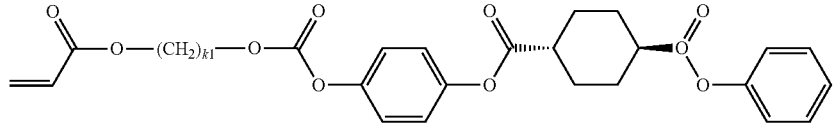
(IV-24)
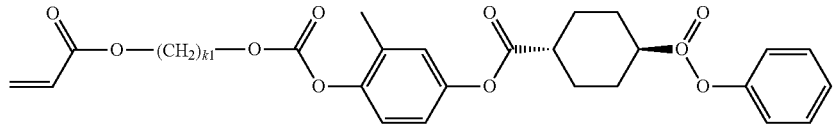
(IV-25)
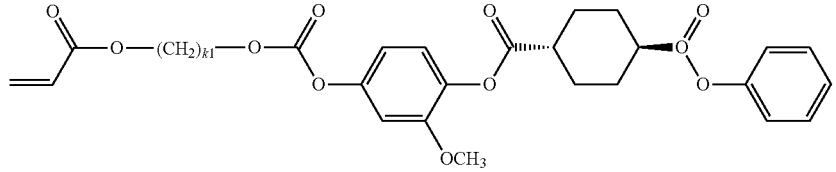
(IV-26)
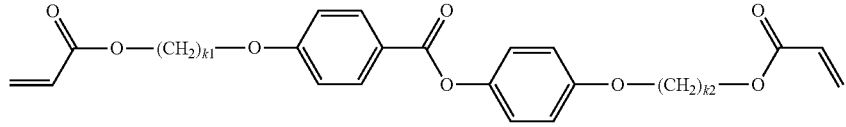
(V-1)

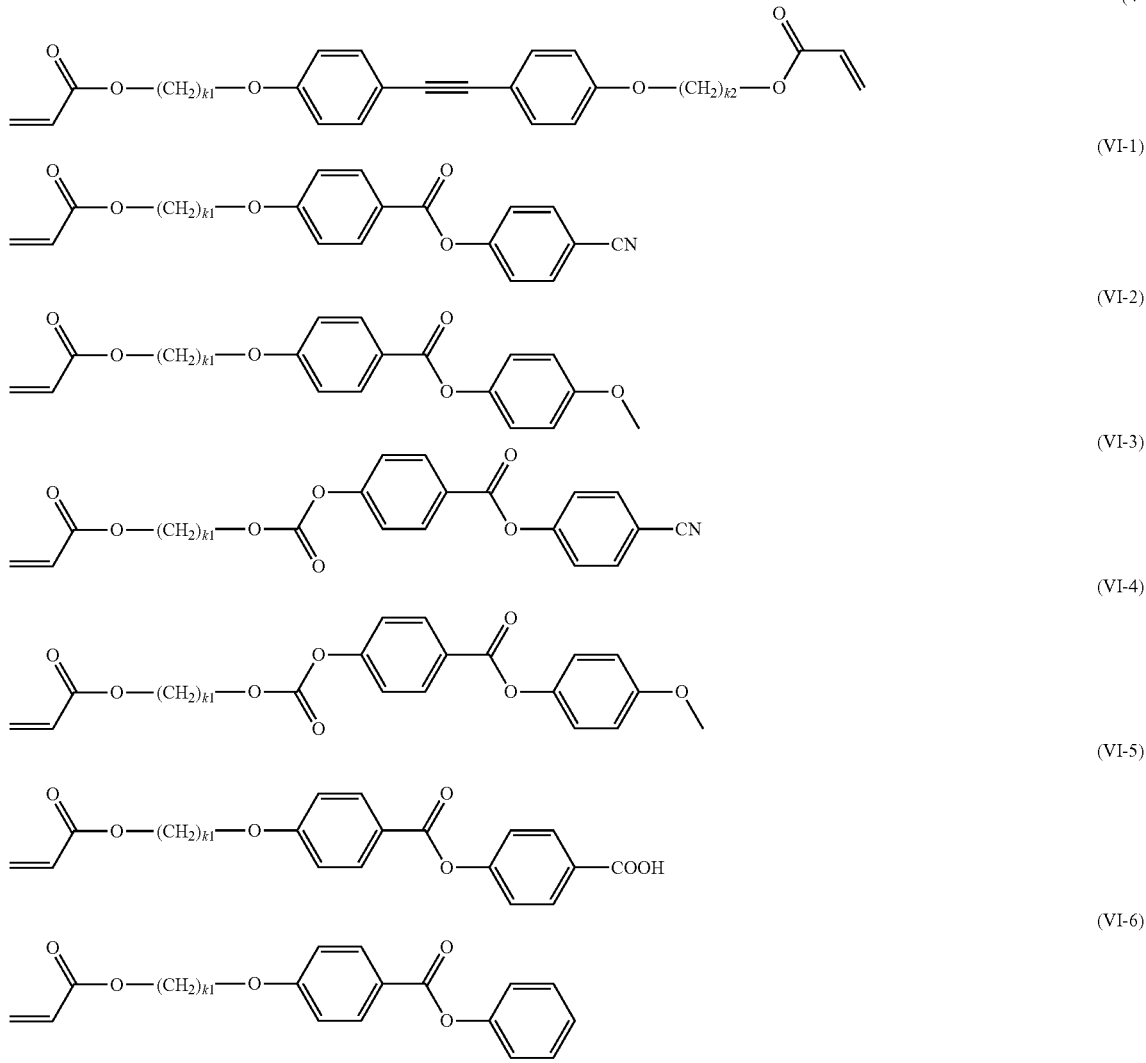

The content of the liquid crystal compound in the composition for forming an optically anisotropic film is generally from 5 to 50 parts by mass, and preferably from 10 to 30 parts by mass, relative to 100 parts by mass of the composition for forming an optically anisotropic film.

<Solvent>

As a solvent, preferable is an organic solvent which can dissolve the components of the composition for forming an optically anisotropic film such as the liquid crystal compound, and when the liquid crystal compound has a polymerizable group, more preferable is a solvent which can dissolve the components of the composition for forming an optically anisotropic film such as the liquid crystal compound and which is inert to a polymerization reaction of the polymerizable group.

Specific examples thereof include alcohol solvents such as methanol, ethanol, ethylene glycol, isopropyl alcohol, propylene glycol, methyl cellosolve, butyl cellosolve, propylene glycol monomethyl ether and phenol; ester solvents such as ethyl acetate, butyl acetate, ethylene glycol methyl ether acetate, γ-butyrolactone, propylene glycol methyl ether acetate and ethyl lactate; ketone solvents such as acetone, methyl ethyl ketone, cyclopentanone, cyclohexanone, methyl amyl ketone and methyl isobutyl ketone; non-chlorinated aliphatic hydrocarbon solvents such as pentane, hexane and heptane; non-chlorinated aromatic hydrocarbon solvents such as toluene and xylene; nitrile solvents such as acetonitrile; ether solvents such as tetrahydrofuran and dimethoxyethane; and chlorinated hydrocarbon solvents such as chloroform and chlorobenzene. It is also possible to combine two or more of the solvents. Among them, preferable are alcohol solvents, ester solvents, ketone solvents, non-chlorinated aliphatic hydrocarbon solvents and non-chlorinated aromatic hydrocarbon solvents.

The content of the solvent is preferably from 10 to 10000 parts by mass, and more preferably from 100 to 5000 parts by mass, relative to 100 parts by mass of a solid content. The concentration of the solid content in the composition for forming an optically anisotropic film is generally from 1 to 90% by mass, preferably from 2 to 50% by mass, and more preferably from 5 to 50% by mass. The "solid content" refers to the total of the components obtained by removing the solvent from the composition for forming an optically anisotropic film.

The composition for forming an optically anisotropic film may also comprise a polymerization initiator, a polymerization inhibitor, a photosensitizer, a leveling agent, a chiral agent, a reactive additive and the like, in addition to the liquid crystal compound and solvent. When the liquid crystal compound has a polymerizable group, the composition for forming an optically anisotropic film preferably has a polymerization initiator.

<Polymerization Initiator>

The polymerization initiator is preferably a photopolymerization initiator and preferably a photopolymerization initiator which generates a radical due to light radiation.

Examples of the photopolymerization initiator include a benzoin compound, a benzophenone compound, a benzyl ketal compound, an α-hydroxyketone compound, an α-aminoketone compound, an α-acetophenone compound, a triazine compound, an iodonium salt and a sulfonium salt. Specific examples thereof include Irgacure 907, Irgacure 184, Irgacure® 651, Irgacure® 819, Irgacure® 250, Irgacure® 369 (manufactured by Ciba Japan K.K.); SEIKUOL® BZ, SEIKUOL® Z, SEIKUOL® BEE (manufactured by Seiko Chemical Co., Ltd); Kayacure® BP100 (manufactured by Nippon Kayaku Co., Ltd.); Kayacure UVI-6992 (manufactured by Dow); Adekaoptomer® SP-152, Adekaoptomer® SP-170 (manufactured by ADEKA Corporation); TAZ-A, TAZ-PP (manufactured by Nihon Siber Hegner); and TAZ-104 (manufactured by SANWA Chemical). Among them, an α-acetophenone compound is preferable. Examples of the α-acetophenone compound include 2-methyl-2-morpholino-1-(4-methylsulfanilphenyl)propan-1-on, 2-dimethylamino-1-(4-morpholinophenyl)-2-benzylbutan-1-on and 2-dimethylamino-1-(4-morpholinophenyl)-2-(4-methylphenylmethyl)butan-1-on. The α-acetophenone compound is more preferably 2-methyl-2-morpholino-1-(4-methylsulfanilphenyl)propan-1-on or 2-dimethylamino-1-(4-morpholinophenyl)-2-benzylbutan-1-on. Examples of a commercially available product of the α-acetophenone compound include Irgacure® 369, 379EG and 907 (manufactured by BASF Japan), and also SEIKUOL® BEE (manufactured by Seiko Chemical Co., Ltd).

In order not to disturb an orientation of the liquid crystal compound, the content of the polymerization initiator is generally from 0.1 to 30 parts by mass, and preferably from 0.5 to 10 parts by mass, relative to 100 parts by mass of the liquid crystal compound.

<Polymerization Inhibitor>

Examples of the polymerization inhibitor include hydroquinone and hydroquinones having a substituent group such as alkyl ether group; catechols having an alkyl ether such as butyl catechol; a radical scavenger such as phyrogallols, 2,2,6,6-tetramethyl-1-piperidinyloxy radical; thiophenols; β-naphthylamines and β-naphthols.

In order not to disturb an orientation of the liquid crystal compound, the content of the polymerization inhibitor is generally from 0.1 to 30 parts by mass, and preferably from 0.5 to 10 parts by mass, relative to 100 parts by mass of the liquid crystal compound.

<Photosensitizer>

Examples of the photosensitizer include xanthones such as xanthone and thioxanthene; anthracene and anthracenes having a substituent group such as alkyl ether group; phenothiazine; and rubrene.

By using the photosensitizer, it is possible to make the photopolymerization initiator highly sensitive. The content of the photosensitizer is generally from 0.1 to 30 parts by mass, and preferably from 0.5 to 10 parts by mass, relative to 100 parts by mass of the liquid crystal compound.

<Leveling Agent>

Examples of the leveling agent include organically modified silicone oil-based leveling agents, polyacrylate-based leveling agents and perfluoroalkyl-based leveling agents. Specific examples thereof include DC3PA, SH7PA, DC11PA, SH28PA, SH29PA, SH30PA, ST80PA, ST86PA, SH8400, SH8700 and FZ2123 (manufactured by Dow Corning Toray Co., Ltd.); KP321, KP323, KP324, KP326, KP340, KP341, X22-161A and KF6001 (manufactured by Shin-Etsu Chemical Co., Ltd.); TSF400, TSF401, TSF410, TSF4300, TSF4440, TSF4445, TSF-4446, TSF4452 and TSF4460 (manufactured by Momentive Performance Materials Japan LLC); Fluorinert® FC-72, FC-40 and FC-3283 (manufactured by Sumitomo 3M Limited); Megafac® R-08, R-30, R-90, F-410, F-411, F-443, F-445, F-470, F-477, F-479, F-482 and F-483 (manufactured by DIC Corporation); F Top (product name) EF301, EF303, EF351 and EF352 (manufactured by Mitsubishi Materials Electronic Chemicals Co., Ltd.); Surflon® S-381, S-382, S-383, S-393, SC-101, SC-105, KH-40 and SA-100 (manufactured by AGC SEIMI CHEMICAL CO., LTD); product names E1830 and E5844 (manufactured by Daikin Fine Chemical Laboratory, Co., Ltd.); and BM-1000, BM-1100, BYK-352, BYK-353 and BYK-361N (product names, manufactured by BM Chemie). It is also possible to combine two or more kinds of the leveling agents.

By using the leveling agent, it is possible to form a smoother optically anisotropic film. In addition, it is possible to control a flowability of the composition for forming an optically anisotropic film in the course of production of an optically anisotropic film. The content of the leveling agent is generally from 0.1 to 30 parts by mass, and preferably from 0.1 to 10 parts by mass, relative to 100 parts by mass of the liquid crystal compound.

<Chiral Agent>

Examples of the chiral agent include known chiral agents (for example, described in "Liquid crystal handbook", Chapter 3, Section 4-3, Chiral agent for TN and STN, page 199, edit: Japan Society for the Promotion of Science, 142 committee, 1989).

Although a chiral agent generally comprises an asymmetric carbon atom, it is also possible to use an axially asymmetric compound or a planarly asymmetric compound, which have no asymmetric carbon atom, as the chiral agent. Examples of the axially asymmetric compound and the planarly asymmetric compound include binaphthyl, helicene, paracyclophane and the derivatives thereof.

Specific examples of the chiral agent include compounds described in JP 2007-269640 A, JP 2007-269639 A, JP 2007-176870 A, JP 2003-137887 A, JP 2000-515496 A, JP 2007-169178 A and JP 09-506088 A, and the chiral agent is preferably Paliocolor® LC756 manufactured by BASF Japan.

In order not to disturb an orientation of the liquid crystal compound, the content of the chiral agent is generally from 0.1 to 30 parts by mass, and preferably from 1.0 to 25 parts by mass, relative to 100 parts by mass of the liquid crystal compound.

<Reactive Additive>

The reactive additive preferably has a carbon-carbon unsaturated bond and an active hydrogen reactive group in the molecule. The "active hydrogen reactive group" refers to a group reactive to a group having an active hydrogen such as a carboxyl group (—COOH), a hydroxyl group (—OH), an amino group (—NH$_2$), and typical examples thereof include an epoxy group, an oxazoline group, a carbodiimide group, an aziridine group, an imide group, an isocyanate group, a thioisocyanate group and a maleic anhydride group.

In the reactive additive, at least two active hydrogen reactive groups preferably exist, and in this case, the multiple active hydrogen reactive groups may be also identical to or independently different from one another.

The carbon-carbon unsaturated bond contained in the reactive additive may be also a carbon-carbon double bond, a carbon-carbon triple bond or the combination thereof, and is preferably a carbon-carbon double bond. Among them, the reactive additive preferably comprises a vinyl group and/or a (meth)acryl group. Furthermore, the active hydrogen reactive group is preferably selected from at least one of the group consisting of an epoxy group, a glycidy group and an isocyanate group, and is particularly preferably a reactive additive having an acryl group and an isocyanate group.

wherein
n represents an integer from 1 to 10,
$R^{1'}$ represents a divalent aliphatic or alicyclic hydrocarbon group having 2 to 20 carbon atoms, or a divalent aromatic hydrocarbon group having 5 to 20 carbon atoms, in two $R^{2'}$ contained in each repeating unit, one represents —NH—, and the other represents a group represented by >N—C(=O)—$R^{3'}$, where $R^{3'}$ represents a hydroxyl group or a group having a carbon-carbon unsaturated bond, and in case that n is 2 or more, at least one of $R^{3'}$ in multiple groups >N—C(=O)—$R^{3'}$ is preferably a group having a carbon-carbon unsaturated bond.

Among the reactive additives represented by the formula (Y), particularly preferable is a compound represented by the following formula (YY) (hereinafter, also referred to as "compound (YY)"):

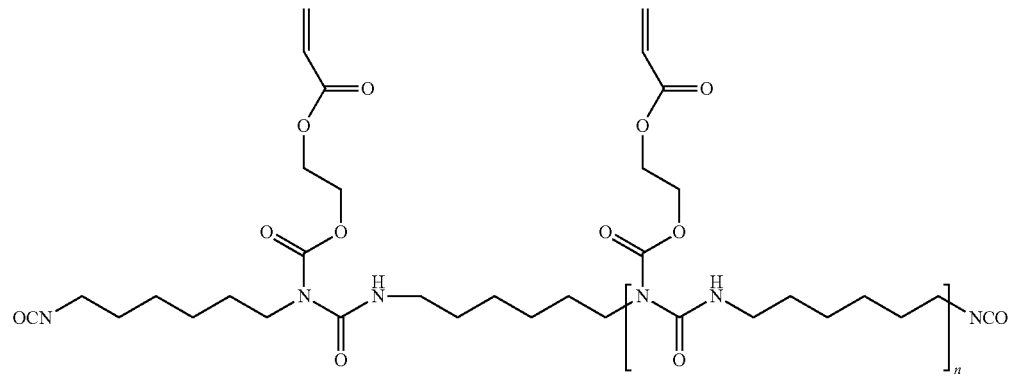

(YY)

wherein n is defined in the same manner as mentioned above.

As compound (YY), a commercially available product can be used directly or optionally after purified. Examples of the commercially available product include Laromer® LR-9000 (manufactured by BASF).

The content of the reactive additive is generally from 0.1 to 30 parts by mass, and preferably from 0.1 to 5 parts by mass, relative to 100 parts by mass of the liquid crystal compound.

<Application>

Examples of a method for applying the composition for forming an optically anisotropic film to a substrate include extrusion coating method, direct gravure coating method, reverse gravure coating method, CAP coating method, ink-jet method, dip coating method, slit coating method, die coating method. Examples thereof also include an application method by using a coater such as a dip coater, a bar coater or a spin coater. Among them, in view that continuous application can be carried out in a Roll-to-Roll type, preferable are CAP coating method, ink-jet method, dip coating method, slit coating method, die coating method and an application method with a bar coater. When an application is carried out in a Roll-to-Roll type, it is also possible to form an orientation film on a substrate and additionally to continuously apply the composition for forming an optically anisotropic film on the obtained orientation film.

The composition for forming an optically anisotropic film, which is applied to the substrate, is conveyed under an environment with an air speed of 0.01 m/s to 0.2 m/s. Preferably, the air speed is 0.01 m/s or higher and 0.1 m/s or lower.

Specific examples of the reactive additive include a compound having a (meth)acryl group and an epoxy group, such as methacryloxy glycidy ether and acryloxy glycidy ether; a compound having a (meth)acryl group and an oxetane group, such as oxetane acrylate and oxetane methacrylate; a compound having a (meth)acryl group and a lactone group, such as lactone acrylate and lactone methacrylate; a compound having a vinyl group and an oxazoline group, such as vinyl oxazoline and isopropenyl oxazoline; an oligomer of compound having a (meth)acryl group and an isocyanate group such as isocyanatomethyl acrylate, isocyanatomethyl methacrylate, 2-isocyanatoethyl acrylate and 2-isocyanatoethyl methacrylate. In addition, examples thereof include a compound having a vinyl group or a vinylene group and an anhydride, such as methacrylic anhydride, acrylic anhydride, maleic anhydride and vinyl maleic anhydride. Among them, preferable are methacryloxy glycidy ether, acryloxy glycidy ether, isocyanatomethyl acrylate, isocyanatomethyl methacrylate, vinyl oxazoline, 2-isocyanatoethyl acrylate, 2-isocyanatoethyl methacrylate, and the above-mentioned oligomers, and particularly preferable are isocyanatomethyl acrylate, 2-isocyanatoethyl acrylate and the above-mentioned oligomer.

Preferable reactive additive is represented by the following formula (Y):

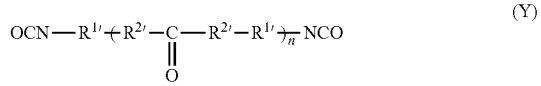

(Y)

The air speed can be established, for example, by a method in which structures for application and conveying zones are set from airflow computation; a method in which a plate for blocking airflow is arranged at upper parts of application and conveying zones; a method in which application and conveying zones are covered; or the like.

A time required from the application of the composition for forming an optically anisotropic film on a substrate up to the application of the hot air to the composition for forming an optically anisotropic film in a drying furnace is preferably from 2 seconds to 5 minutes, more preferably from 2 seconds to 3 minutes, and further preferably from 5 seconds to 1 minute.

If the time to arrive at the drying furnace is less than 2 seconds, non-uniformity of drying may arise due to flow of a coating film. On the other hand, if the time to arrive at the drying furnace is more than 5 minutes, undesirably, a dry coating film is formed on the surface or a contaminant is attached on the surface.

A hot air having an air speed of 1 m/s or higher is applied to the applied composition for forming an optically anisotropic film in the drying furnace. The air speed the hot air is preferably from 1 m/s to 10 m/s, and more preferably from 2.5 m/s to 5 m/s.

The temperature of the hot air is preferably from 40 to 250° C., more preferably from 50 to 200° C., further preferably from 60 to 150° C., and particularly preferably from 70 to 120° C.

The drying time is, depending on a solvent type, preferably from 10 seconds to 60 minutes, and more preferably from 30 seconds to 30 minutes.

The liquid crystal compound contained in the applied composition for forming an optically anisotropic film is generally oriented by removing a solvent from the composition for forming an optically anisotropic film to change it into a liquid crystal phase.

The oriented liquid crystal compound may be also used directly as an optically anisotropic film. However, when the liquid crystal compound has a polymerizable group, it is preferable to polymerize and cure the liquid crystal compound. An optically anisotropic film obtained by polymerization of the liquid crystal compound is insulated from the influence of the change of the birefringence due to heat, since the orientation of the liquid crystal compound is fixed.

A method for polymerizing the liquid crystal compound having a polymerizable group is preferably a photopolymerization method. Since it is possible to carry out a polymerization at a low temperature according to the photopolymerization method, the range of choice for a resin substrate to be used is expanded in terms of heat resistance. A photopolymerization reaction is generally carried out by radiating a visible light, an ultraviolet light or a laser light, preferably an ultraviolet light.

The time to radiate a light is generally from 5 seconds to 10 minutes, preferably from 5 seconds to 2 minutes, more preferably from 5 seconds to 1 minute, and further preferably from 5 seconds to 30 seconds.

In the production process of the present invention, it is preferable to continuously carry out the steps (1) to (3) on an elongated film roll as a substrate.

Thus, the optically anisotropic film produced by the production process of the present invention (hereinafter, also referred to as the present optically anisotropic film) is obtained.

The present optically anisotropic film may also be layered with the substrate, or may be scraped from the substrate and stuck on another optical film or the like so as to use it.

The thickness of the optically anisotropic film, which can be adjusted depending on its use, is preferably from 0.1 μm to 10 μm, and in view of reduction of a photoelasticity, further preferably from 0.2 μm to 5 μm.

The haze value of the present optically anisotropic film is preferably 1.2% or lower, further preferably 0.5% or lower, and particularly preferably 0.25% or lower. A lower haze value means a higher transparency.

The haze value can be measured by means of a generally commercially available haze meter, and examples of the haze meter include a haze meter (type: HZ-2) manufactured by Suga Test Instruments Co., Ltd. and the like.

An orientation condition of the liquid crystal compound may be horizontal orientation, vertical orientation, hybrid orientation, inclined orientation and the like, and vertical orientation is preferable. When the liquid crystal compound has a polymerizable group, the present optically anisotropic film preferably comprises a polymer of a liquid crystal compound, which is in vertical orientation.

The expressions such as "horizontal" and "vertical" represent an orientation direction of a liquid crystal compound in a long side direction relative to a surface of a substrate on which an optically anisotropic film is formed. The "vertical orientation" refers to an orientation in which a long side direction of a liquid crystal compound is arranged in a vertical direction relative to a surface of a substrate on which an optically anisotropic film is formed. The "vertical" means 90°±20°.

The orientation condition changes depending on properties of an orientation film and a liquid crystal compound, and the combination thereof can be arbitrarily selected. For example, if a material in which an orientation film exhibits horizontal orientation as an orientation controlling force is used, a liquid crystal compound can form horizontal orientation or hybrid orientation. If a material in which vertical orientation is exhibited is used, a liquid crystal compound can form vertical orientation or inclined orientation.

When an orientation film comprises an anisotropic polymer, the orientation controlling force can be optionally adjusted depending on a surface condition and a rubbing condition, and in case of an optically anisotropic film, the orientation controlling force can be optionally adjusted by a radiating condition of a polarization light or the like. In addition, an orientation can be also controlled by selecting the properties of the liquid crystal compound such as surface tension or liquid crystallinity.

When a liquid crystal compound contained in the composition for forming an optically anisotropic film which is applied to a substrate exhibits a liquid crystal phase such as a nematic phase, birefringence due to monodomain orientation is exhibited.

A number of the present optically anisotropic films may be also layered, and the present optically anisotropic film may be combined with another film. When a number of the present optically anisotropic film are layered or when the present optically anisotropic film may be combined with another film, it is possible to use it as a viewing angle compensation film, a viewing angle expansion film, an antireflection film, a polarization plate, a circular polarization plate, an elliptical polarization plate or a luminance-improving film.

The optical properties of the present optically anisotropic film can be changed depending on an orientation condition of a liquid crystal compound, and the present optically anisotropic film can be used as a retardation film for a liquid crystal display device of VA (vertical alignment) mode, IPS (in-plane switching) mode, OCB (optically compensated bend) mode, TN (twisted nematic) mode, STN (super twisted nematic) mode or the like. Among them, the present optically anisotropic film is suitable for a retardation film for a liquid crystal display device of IPS mode.

In addition, the present optically anisotropic film can be also used as a retardation film to be used for converting a liner polarization light confirmed from an oblique angle of a light emitting side into a circular polarization light or an elliptical polarization light, for converting a circular polarization light or an elliptical polarization light into a liner polarization light, or for converting an orientation direction of a liner polarization light.

In an index ellipsoid formed of the optically anisotropic film, when nx is defined as a principal refractive index which is parallel to a film surface, ny is defined as a refractive index which is parallel to a film surface and is vertical to a direction of nx, and nz is defined as a refractive index which is vertical to a film surface, optically anisotropic films are classified as follows:

Positice-A plate in nx>ny≈nz,
Negative-C plate in nx≈ny>nz,
Positive-C plate in nx≈ny<nz,
Positive-O plate and negative-O plate in nx≠ny≠nz.

The present optically anisotropic film is preferably a positive-C plate, which has an optical property represented by nx≈ny<nz.

When the present optically anisotropic film is used as a positive-C plate, a front retardation value for a light of 550 nm, Re(550), is generally in a range of 0 to 10 nm and preferably in a range of 0 to 5 nm, and a retardation value in a thickness direction, $R_{th}$, is generally in a range of −10 nm to −300 nm and preferably in a range of −20 nm to −200 nm.

A retardation value $R_{th}$ in a thickness direction, which means a refractive index anisotropy of an optically anisotropic film in a thickness direction, can be calculated from a retardation value $R_{50}$, which is measured with being tilted at 50 degrees to an in-plane fast axis which is a tilt axis, and an in-plane retardation value $R_0$. That is, the retardation value $R_{th}$ in a thickness direction can be calculated by determining nx, ny and nz according to the following formulae (9) to (11) from an in-plane retardation value $R_0$, a retardation value $R_{50}$, which is measured with being tilted at 50 degrees to an in-plane fast axis which is a tilt axis, a film thickness d and an average refractive index of a film $n_0$, and assigning them to formula (8).

$$R_{th}=[(nx+ny)/2-nz]*d \quad (8)$$

$$R_0 \approx (nx-ny)*d \quad (9)$$

$$R_{50}=(nx-ny')*d/\cos(\phi) \quad (10)$$

$$(nx+ny+nz)/3=n_0 \quad (11)$$

wherein $\phi=\sin^{-1}[\sin(50°)/n_0]$, $ny'=ny*nz/[ny^2*\sin^2(\phi)+nz^2*\cos^2(\phi)]^{1/2}$ The present optically anisotropic film is also useful as a component constituting a polarization plate. A polarization plate of the present invention comprises at least one of the present optically anisotropic film, and the present optically anisotropic film may be comprised as a retardation film.

Specific examples of polarization plate 4 include polarization plates represented in FIG. 1(a) to FIG. 1(e). Polarization plate 4a represented in FIG. 1(a) is a polarization plate in which retardation film 1 and orientation film 2 are directly layered. Polarization plate 4b represented in FIG. 1(b) is a polarization plate in which retardation film 1 and orientation film 2 are stuck via adhesive agent layer 3'. Polarization plate 4c represented in FIG. 1(c) is a polarization plate in which retardation film 1 and retardation film 1' are layered and additionally retardation film 1' and orientation film 2 are layered. Polarization plate 4d represented in FIG. 1(d) is a polarization plate in which retardation film 1 and retardation film 1' are stuck via adhesive agent layer 3 and additionally orientation film 2 is layered on retardation film 1'. Polarization plate 4e represented in FIG. 1(e) is a polarization plate in which retardation film 1 and retardation film 1' are stuck via adhesive agent layer 3 and additionally retardation film 1' and orientation film 2 are stuck via retardation film 3'. The "adhesive agent" refers to an adhesive agent and/or a collective term of an adhesive agent. At least one selected from the group consisting of the above retardation film 1 and retardation film 1' comprises the present optically anisotropic film.

Orientation film 2 should be a film having a polarizing function. Examples of the film include stretched film which has absorbed a pigment having absorption anisotropy; and a film on which a pigment having absorption anisotropy is applied. Examples of a pigment having absorption anisotropy include a dichroism pigment such as iodine and an azo compound.

Examples of the stretched film which has absorbed a pigment having absorption anisotropy include a film obtained by stretching a polyvinyl alcohol-based film which has absorbed a dichroism pigment; and a film obtained by stretching a polyvinyl alcohol-based film and then absorbing a dichroism pigment.

Examples of the film on which a pigment having absorption anisotropy is applied include a film obtained by applying a composition comprising a dichroism pigment having liquid crystallinity or a composition comprising a dichroism pigment and a liquid crystal compound.

The film having a polarizing function preferably has a protective film on one side or both sides. For example, the protective film is identical to the above-mentioned substrate.

Specific examples of the stretched film which has absorbed a pigment having absorption anisotropy include polarization plates described in JP 3708062 B, JP 4432487 B and the like.

Specific examples of the film on which a pigment having absorption anisotropy is applied include orientation films described in JP 2012-33249 A and the like.

The thickness of orientation film 2 is preferably thinner. However, too thin film has a reduced strength and tends to be inferior in workability. The thickness of the orientation film is generally from 0.1 μm to 300 μm, preferably from 1 μm to 200 μm and more preferably from 5 μm to 100 μm.

An adhesive agent which forms adhesive agent layer 3 and adhesive agent layer 3' is preferably an adhesive agent having high transparency and superior heat resistance. Examples of such an adhesive agent include an acryl-based adhesive agent, an epoxy-based adhesive agent and an urethane-based adhesive agent.

The polarization degree of a polarization plate having the present optically anisotropic film is generally 99.9% or higher and preferably 99.97% or higher.

The present optically anisotropic film can be used for a display device. Examples of the display device include a liquid crystal display device having a liquid crystal panel in which an optically anisotropic film is stuck to the liquid crystal panel, and an organic electroluminescence (hereinafter, also referred to as "EL") display device having an organic EL panel obtained by sticking an optically anisotropic film to a luminescent layer. As to an embodiment of a display device having the present optically anisotropic film, a liquid crystal display device will be described.

Figure 2:
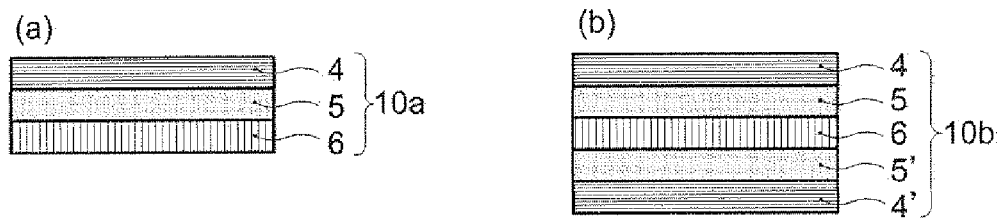
FIG. 2 is a diagram showing an example of a display device according to the present invention.

Examples of the liquid crystal display device include liquid crystal display devices 10a and 10b, which are represented in FIG. 2(a) and FIG. 2(b), respectively. In liquid crystal display device 10a represented in FIG. 2(a), polarization plate 4 of the present invention and liquid crystal panel 6 are stuck via adhesion layer 5. In liquid crystal display device 10b represented in FIG. 2(b), polarization plate 4 of the present invention is stuck to one side of liquid crystal panel 6 via adhesion layer 5, and polarization plate 4' of the present invention is stuck to the other side of liquid crystal panel 6 via adhesion layer 5', respectively. In these liquid crystal display devices, it is possible to change an orientation of a liquid crystal molecule so as to provide monochromatic display by applying voltage to a liquid crystal display with an electrode which is not show in the figures.

EXAMPLES

Hereinafter, the present invention will be described in more detail by examples. "%" and "part(s)" in the examples refer to % by mass and part(s) by mass, unless otherwise described.

(Preparation of Anisotropic Polymer Composition)

A formulation of an anisotropic polymer composition is shown in Table 1. N-methyl-2-pyrolidone and 2-butoxyethanol were added to a commercially available product, SUNEVER SE-610 (manufactured by NISSAN CHEMICAL INDUSTRIES, LTD.) to obtain an anisotropic polymer composition (1).

TABLE 1

|  | SUNEVER SE-610 | N-methyl-2-pyrolidone | 2-butoxyethanol |
| --- | --- | --- | --- |
| Anisotropic polymer composition (1) | 0.6% | 79.5% | 19.9% |

The values in Table 1 represent content ratios of each component relative to the total of the prepared composition. As to SE-610, the solid content was converted from the concentration described in the delivered specification.

(Preparation of Composition for Forming Optically Anisotropic Film)

A formulation of an anisotropic polymer composition is shown in Table 2. The components were mixed, and the resulting solution was stirred at 80° C. for one hour and then cooled to room temperature to obtain a composition for forming optically anisotropic film (1).

TABLE 2

|  | Liquid crystal compound | Photo-polymerization initiator | Leveling agent | Additive | Solvent |
| --- | --- | --- | --- | --- | --- |
| Composition for forming optically anisotropic film (1) | LC242 (19.2%) | Irg907 (0.5%) | BYK-361N (0.1%) | LR9000 (1.1%) | PGMEA (79.1%) |

The values in the brackets in Table 2 represent content ratios of each component relative to the total of the prepared composition.

In Table 2, LR-9000 represents Laromer® LR-9000 (manufactured by BASF), Irg907 represents Irgacure® 907 (manufactured by BASF Japan), BYK361N represents a leveling agent manufactured by BYK Japan KK, LC242 represents a liquid crystal compound represented by the following formula, and PGMEA represents propylene glycol 1-monomethyl ether 2-acetate.

LC242

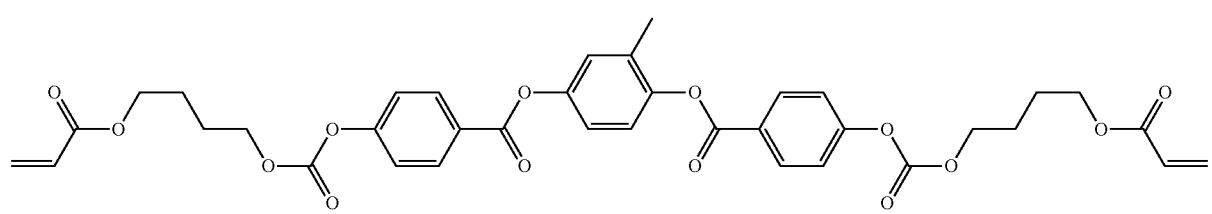

Example 1

A surface of a cycloolefin polymer film (Arton, manufactured by JSR Corporation) having a protective film made of polyethylene terephthalate on its reverse side, was plasma-treated by means of a normal pressure plasma surface treatment device (roll direct head type, AP-T04S-R890) manufactured by Sekisui Chemical CO., LTD. Composition for forming an optically anisotropic film (1) was applied to the plasma-treated surface by means of a die coater and dried to form an orientation film having a thickness of 40 nm. Composition for forming an optically anisotropic film (1) was applied to the formed orientation film by means of a die coater. The air speed at height of 5 cm from the film surface directly after application was measured at 0.1 m/s. While the air speed was maintained at 0.1 m/s, the substrate on which composition for forming an optically anisotropic film (1) had been applied was conveyed to a drying furnace (temperature: 100° C., air speed: 4.2 m/s) and dried. The time required from the application of composition for forming an optically anisotropic film (1) on a substrate up to the application of a hot air in the drying furnace was 20 seconds. Then, the liquid crystal compound was polymerized by radiating an ultraviolet light by means of a high-pressure mercury lamp to obtain retardation film (1) having optically anisotropic film (1).

Example 2

Retardation film (2) having optically anisotropic film (2) was obtained in the same condition as in Example 1 except in that the protective film on the reverse side of the substrate was removed and only the cycloolefin film was conveyed.

Reference Example 1

Retardation film (3) having optically anisotropic film (3) was obtained in the same condition as in Example 1 except in that an air speed in a zone for applying composition for forming an optically anisotropic film (1) was set at 0.3 m/s.
[Assessment of Transparency]

The haze values of retardation films (1) to (3) were measured in double beam method by means of a haze meter (type: HZ-2) manufactured by Suga Test Instruments Co., Ltd.
[Measurement of Optical Properties]

The retardation values of retardation films (1) to (3) were measured by means of a measuring apparatus (KOBRA-WR, manufactured by Oji Scientific Instruments). In the measurement, incident angles of the light were changed to observe the orientation condition of the liquid crystal compound. The result is shown in Table 3.
[Observation of Defect]

Optically anisotropic film (1), (2) or (3) was put between polarization plates arranged in a crossed Nicol state, and defect was confirmed by observing transmitted light of a backlight at the oblique direction of 45 degrees. The result is shown in Table 3.

TABLE 3

| | Haze value | Orientation | Defect |
|---|---|---|---|
| Example 1 | 0.19% | Vertical orientation | None |
| Example 2 | 0.30% | Vertical orientation | Little |
| Reference example 1 | 1.23% | Vertical orientation | Totally existing |

Retardation films (1) and (2) having optically anisotropic film (1) or (2) had low haze values and high transparency.

According to the present invention, it is possible to obtain an optically anisotropic film having high transparency.

DESCRIPTION OF SYMBOLS

1, 1': Retardation film
2: Orientation film
3, 3': Adhesive agent layer
4a, 4b, 4c, 4d, 4e, 4, 4': Polarization plate
5, 5': Adhesion layer
6: Liquid crystal panel
10a, 10b: Liquid crystal display device

The invention claimed is:
1. A process for producing an optically anisotropic film, wherein the following steps are carried out in order:
(1) a step of applying a composition for forming an optically anisotropic film to a surface of a substrate, the composition comprising a solvent and a liquid crystal compound selected from formula (I), (II), (III), (IV), (V), and (VI):

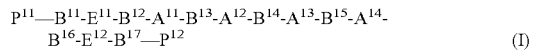  (I)

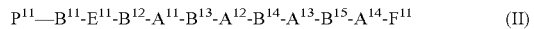  (II)

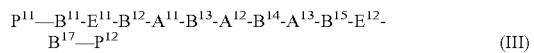  (III)

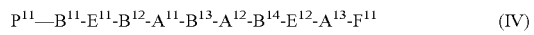  (IV)

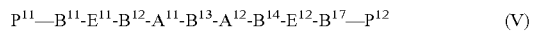  (V)

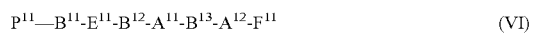  (VI)

wherein
$P^{11}$ represents a hydrogen atom or a polymerizable group,
$A^{11}$ represents a divalent alicyclic hydrocarbon group or a divalent aromatic hydrocarbon group, where a hydrogen atom of the divalent alicyclic hydrocarbon group and of the divalent aromatic hydrocarbon group may be substituted with a halogen atom, an alkyl group having 1 to 6 carbon atoms, an alkoxy group having 1 to 6 carbon atoms, a cyano group or a nitro group, and where a hydrogen atom of the alkyl group having 1 to 6 carbon atoms and of the alkoxy group having 1 to 6 carbon atoms may be substituted with a fluorine atom,
$A^{12}$ to $A^{14}$ each independently represents a divalent alicyclic hydrocarbon group or a divalent aromatic hydrocarbon group, where a hydrogen atom of the divalent alicyclic hydrocarbon group and of the divalent aromatic hydrocarbon group may be substituted with a halogen atom, an alkyl group having 1 to 6 carbon atoms, an alkoxy group having 1 to 6 carbon atoms, a cyano group or a nitro group, and where a hydrogen atom of the alkyl group having 1 to 6 carbon atoms and of the alkoxy group having 1 to 6 carbon atoms may be substituted with a fluorine atom,
$B^{11}$ represents —O—, —S—, —CO—O—, —O—CO—, —O—CO—O—, —CO—NR$^{16}$—, —CO—, —CS— or a single bond, where $R^{16}$ represents a hydrogen atom or an alkyl group having 1 to 6 carbon atoms,
$B^{12}$ and $B^{13}$ each independently represent —C≡C—, —CH=CH—, —CH$_2$—CH$_2$—, —O—, —S—, —C(=O)—, —C(=O)—O—, —O—C(=O)—, —O—C(=O)—O—, —CH=N—, —N=CH—, —N=N—, —C(=O)—NR$^{16}$—, —NR$^{16}$—C(=O)—, —OCH$_2$—, —OCF$_2$—, —CH$_2$O—, —CF$_2$O—, —CH=CH—C(=O)—O—, —O—C(=O)—CH=CH— or a single bond,
$B^{14}$ to $B^{16}$ each independently represents —C≡C—, —CH=CH—, —CH$_2$—CH$_2$—, —O—, —S—, —C(=O)—, —C(=O)—O—, —O—C(=O)—, —O—C(=O)—O—, —CH=N—, —N=CH, —N=N—, —C(=O)—NR$^{16}$—, —NR$^{16}$—C(=O)—, —OCH$_2$—, —OCF$_2$, —CH$_2$O—, —CF$_2$O—, —CH=CH—C(=O)—O—, —O—C(=O)—CH=CH— or a single bond,
$B^{17}$ represents —O—, —S—, —CO—O—, —O—CO—, —O—CO—O—, —CO—NR$^{16}$, —NR$^{16}$—CO—, —CO—, —CS— or a single bond, where $R^{16}$ represents a hydrogen atom or an alkyl group having 1 to 6 carbon atoms,
$E^{11}$ represents an alkanediyl group having 1 to 12 carbon atoms, where a hydrogen atom contained in the alkanediyl group may be also substituted with an alkoxy group having 1 to 5 carbon atoms, a hydrogen atom of the alkoxy group may be also substituted with a halogen atom, and —CH$_2$— constituting the alkanediyl group may be also substituted with —O— or —CO—, E$^{12}$ represents an alkanediyl group having 1 to 12 carbon atoms, where a hydrogen atom contained in the alkanediyl group may be also substituted with an alkoxy group having 1 to 5 carbon atoms, a hydrogen atom of the alkoxy group may be also substituted with a halogen atom, and —CH$_2$— constituting the alkanediyl group may be also substituted with —O— or —CO—, F$^{11}$ represents a hydrogen atom, an alkyl group having 1 to 13 carbon atoms, an alkoxy group having 1 to 13 carbon atoms, a cyano group, a nitro group, a trifluoromethyl group, a dimethylamino group, a hydroxy group, a methylol group, a formyl group, a sulfo group (—SO$_3$H), a carboxy group, an alkoxycarbonyl group having 1 to 10 carbon atoms or a halogen atom, where —CH$_2$— constituting the alkyl group and alkoxy group may be also substituted with —O—, and P$^{12}$ represents a hydrogen atom or a polymerizable group, and at least one of P$^{11}$ and P$^{12}$ is a polymerizable group;

(2) a step of conveying the applied composition to a drying furnace under an environment with an air speed of 0.01 m/s to 0.2 m/s; and (3) a step of removing the solvent by applying hot air at an air speed of 1 m/s or higher to the applied composition in the drying furnace.

2. The process for producing an optically anisotropic film according to claim 1, wherein a time required from the application of the composition for forming an optically anisotropic film in step (1) up to the application of the hot air in step (3) is from 2 seconds to 5 minutes.

3. The process for producing an optically anisotropic film according to claim 1, further comprising a step of forming an orientation film on a surface of the substrate on which the composition is to be applied, wherein the step of forming an orientation film is carried out before step (1), and the composition is applied to the orientation film.

4. The process for producing an optically anisotropic film according to claim 1, wherein the substrate has a protective film on a surface reverse to the surface on which the composition for forming an optically anisotropic film is applied.

5. The process for producing an optically anisotropic film according to claim 1, wherein the substrate is an elongated film roll.

6. An optically anisotropic film obtained by the process for producing an optically anisotropic film according to claim 1.

7. The optically anisotropic film according to claim 6, wherein the liquid crystal compound is in vertical orientation.

8. The optically anisotropic film according to claim 6 for use in an IPS (in-plane switching) liquid crystal display device.

9. A retardation film comprising the optically anisotropic film according to claim 6.

10. A polarization plate comprising the optically anisotropic film according to claim 6.

11. A display device comprising the optically anisotropic film according to claim 6.

12. The process for producing an optically anisotropic film according to claim 2, further comprising a step of forming an orientation film on a surface of the substrate on which the composition is to be applied, wherein the step of forming an orientation film is carried out before step (1), and the composition is applied to the orientation film.

13. The optically anisotropic film according to claim 7 for use in an IPS (in-plane switching) liquid crystal display device.

14. A retardation film comprising the optically anisotropic film according to claim 7.

15. A polarization plate comprising the optically anisotropic film according to claim 7.

16. A display device comprising the optically anisotropic film according to claim 7.

* * * * *